United States Patent [19]
Kim

[11] Patent Number: 6,091,685
[45] Date of Patent: *Jul. 18, 2000

[54] OPTICAL DISC RECORDING/PLAYING APPARATUS AND METHOD FOR SYNCHRONIZING RECORDING OF NEW DATA

[75] Inventor: Dae Young Kim, Seoul, Rep. of Korea

[73] Assignee: LG Electronics, Inc., Seoul, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/754,560

[22] Filed: Nov. 21, 1996

[30] Foreign Application Priority Data

Nov. 21, 1995 [KR] Rep. of Korea .................. 95-42556

[51] Int. Cl.$^7$ .................................................. G11B 7/00
[52] U.S. Cl. ............................................. 369/50; 369/116
[58] Field of Search .................... 369/44.37, 58, 369/124, 59, 60, 54, 44.11, 50, 116, 275.3, 48

[56] References Cited

U.S. PATENT DOCUMENTS

| | | |
|---|---|---|
| 4,757,489 | 7/1988 | Yamagushi .................. 369/50 |
| 4,761,692 | 8/1988 | Yoshida et al. ............... 369/50 |
| 4,815,063 | 3/1989 | Aoshima et al. .............. 369/50 |
| 4,893,298 | 1/1990 | Pasman et al. ............ 369/44.37 |
| 4,987,301 | 1/1991 | Nakamura ............... 369/44.37 |
| 5,105,407 | 4/1992 | Ishika ....................... 369/4.37 |
| 5,105,410 | 4/1992 | Maeda et al. ............ 369/44.37 |
| 5,216,562 | 6/1993 | Luecke et al. ........... 369/44.37 |
| 5,270,992 | 12/1993 | Yasuda et al. ............... 369/50 |
| 5,295,125 | 3/1994 | Oonishi et al. .......... 369/44.37 |
| 5,341,355 | 8/1994 | Gotoh et al. ............ 369/44.37 |
| 5,381,392 | 1/1995 | Hira ......................... 369/58 |
| 5,394,383 | 2/1995 | Hira ......................... 369/58 |
| 5,442,497 | 8/1995 | Spruit et al. ............. 369/44.37 |
| 5,452,273 | 9/1995 | Onagi ........................ 369/13 |
| 5,493,548 | 2/1996 | Kamioka ................. 369/44.37 |
| 5,494,782 | 2/1996 | Maenza et al. . |
| 5,541,902 | 7/1996 | Ten Hate .................... 369/58 |
| 5,559,774 | 9/1996 | Watanabe et al. ........... 369/59 |
| 5,561,644 | 10/1996 | Kondo ....................... 369/50 |
| 5,568,459 | 10/1996 | Takamori et al. ........... 369/50 |
| 5,594,711 | 1/1997 | Koyama ................. 369/44.32 |
| 5,598,390 | 1/1997 | Saitoh et al. ............... 369/50 |
| 5,638,350 | 6/1997 | Fuji ....................... 369/44.37 |
| 5,657,309 | 8/1997 | Ebisawa et al. ......... 369/44.37 |
| 5,671,209 | 9/1997 | Kamioka et al. ........ 369/44.37 |
| 5,699,335 | 12/1997 | Joo et al. .................. 369/50 |
| 5,703,854 | 12/1997 | Kuroda et al. .............. 369/50 |
| 5,712,836 | 1/1998 | Kamoto et al. ............. 369/50 |
| 5,715,157 | 2/1998 | Kuhn ........................ 369/53 |
| 5,717,672 | 2/1998 | Furukawa et al. ....... 369/44.29 |
| 5,726,958 | 3/1998 | Min .......................... 369/50 |
| 5,745,460 | 4/1998 | Tateishi .................... 369/58 |
| 5,764,610 | 6/1998 | Yoshida et al. ............. 369/50 |
| 5,774,434 | 6/1998 | Arataki et al. ............. 369/47 |
| 5,774,438 | 6/1998 | Park et al. ................. 369/54 |
| 5,777,967 | 7/1998 | Ishibashi et al. ........... 369/54 |
| 5,805,548 | 9/1998 | Ishihara et ................. 369/50 |
| 5,809,006 | 9/1998 | Davis et al. ............... 369/50 |
| 5,818,807 | 10/1998 | Kuroda et al. .............. 369/58 |
| 5,825,733 | 10/1998 | Ogawa ...................... 369/50 |

*Primary Examiner*—Nabil Hindi

[57] ABSTRACT

An optical disc recording/playing apparatus appropriate to accommodate a large scaled driver by spotting laser beams on a signal track of an optical disc, wherein a data is recorded in a certain density to have a certain distance between the laser beams so as to facilitate a data recording and reproducing. The optical disc includes a spiral track thereon having a land and groove structure, wherein the track is unwobbled and identical in width of lands and grooves thereof and further there are not recorded a free-formatted pilot signal for controlling a spinning rate of the disc and an address signal for detecting a track location.

30 Claims, 21 Drawing Sheets

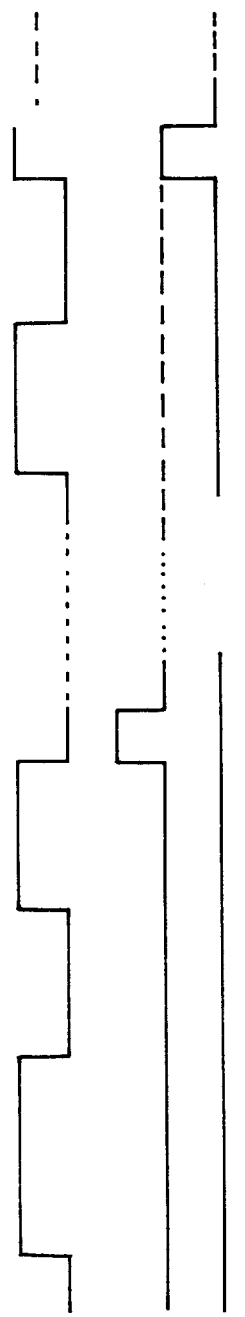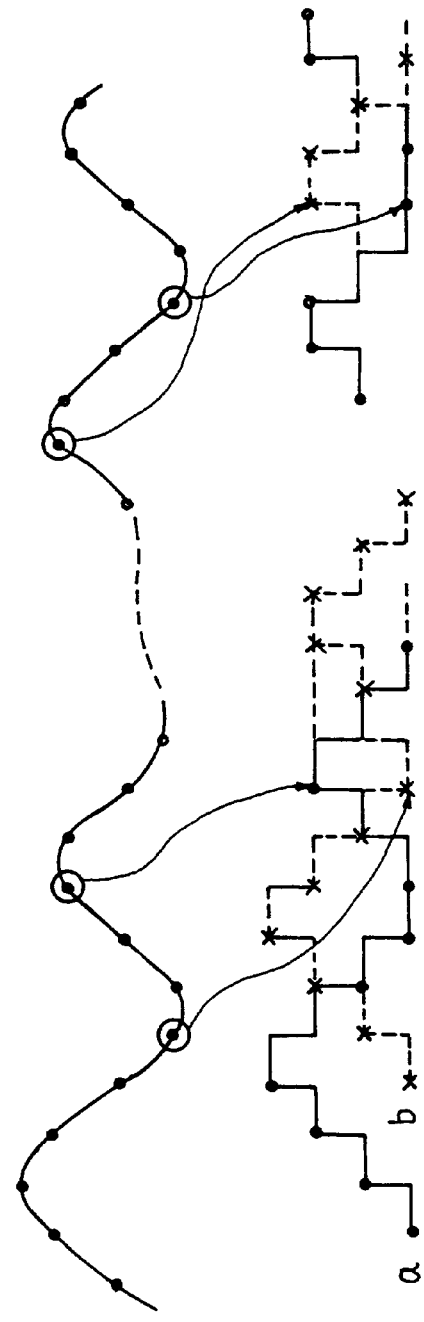
FIG. 10A
FIG. 10B
FIG. 10C
FIG. 10D
FIG. 10E
FIG. 10F

OPTICAL DISC RECORDING/PLAYING APPARATUS AND METHOD FOR SYNCHRONIZING RECORDING OF NEW DATA

BACKGROUND OF THE INVENTION

1. Field of the Invention

The present invention relates to an optical disc player, and more particularly to an optical disc recording/playing apparatus and method for improving data recording capacity and compatibility of an optical disc.

2. Description of the Prior Art

An optical disc recording/playing apparatus generally records data on an optical disc and retrieves the recorded data by scanning portions of the optical disc by a laser beam converged via an optical pick-up, wherein the optical pick-up focusing, tracking and the spinning rate of the optical disc are controlled.

In a play-only optical disc such as a compact disc (CD), an information signal is continuously recorded in the form of pits formed along a spiral track of the disc. That is, the general optical disc recording/playing apparatus scans a focused laser beam to a signal pit of an optical disc and carries out tracking control for detecting a synchronous signal of a channel bit signal array, and compares the frequency and phase of the detected synchronous signal with those of a standard synchronous signal to thereby detect a control signal for controlling the spinning rate of the optical disc.

As shown in FIG. 1, a conventional optical disc playing apparatus includes: a turntable 2 which accommodates an optical disc 1 placed thereon; an optical pick-up 3 for projecting a laser beam to the optical disc 1, detecting the laser beam reflected against the optical disc 1, and converting the detected value into electrical signals a, b, c, d, e and f; a laser stabilizer 4 for stably transmitting a laser beam to the optical pick-up 3; a playback signal processor 5 for receiving the electrical signals a, b, c, d, e and f output from the optical pick-up 3 and generating a focus control signal Fe, a tracking control signal Te and a radio frequency generating signal RF; a focusing controller 6 for performing a focus control of the optical pick-up 3 in accordance with the focus control signal Fe output from the playback signal processor 5; a tracking controller 7 for performing tracking control in accordance with the tracking control signal Te output from the playback signal processor 5; a channel bit signal processor 8 for zero-crossing the radio frequency generating signal RF output from the playback signal processor 5 to-thereby produce a square wave signal and detecting a channel bit row signal CHBr and a synchronized signal of a channel bit row SYNr; a digital signal processor 9 for decoding the detected channel bit row signal CHBr and performing error correction so as to convert such signal into digital data; a standard clock signal generator 10 for generating a standard synchronized signal SYNs; a motor control signal generator 11 for generating a motor control signal Me by comparing the standard synchronized signal SYNs output from the standard clock signal generator 10 with the channel bit synchronized signal SYNr output from the channel bit signal processor 8; and a motor controller 12 for controlling a motor 13 in accordance with the motor control signal Me output from the motor control signal generator 11.

The optical pick-up 3 includes: a laser diode LD for generating a laser beam; a grating GR for branching the laser beam output from the laser diode LD into a main beam and a pair of subbeams for controlling a tracking servo; a beam splitter BS for splitting the beam from the laser diode LD and the beam reflected against the disc; an object lens OL for converging the three laser beams passing through the beam splitter BS onto a portion of a signal track of the disc; a focus activator FA and a tracking activator TA for moving the object lens OL in the direction of tracking and/or focusing so that the object lens OL can accurately converge the three laser beams onto a signal track of the disc; a wolla stone prism WP for reflecting a beam which has been reflected from the disc and has passed through the beam splitter BS; a sensor lens SL for converging a beam reflected from the wolla stone prism WP; and a photo detector PD for converting the laser beam converged by the sensor lens SL into electrical signals a,b,c,d,e and f.

With reference to the accompanying drawings, the operation of the thusly composed conventional optical disc playing apparatus will now be described.

First, when the laser diode LD of the optical pick-up 3 generates a laser beam under the control of the laser stabilizer 4, the grating GR branches the laser beam into a main beam and a pair of subbeams for the tracking servo. Then, the beam splitter BS projects the three beams toward the object lens OL.

The object lens OL converges the three beams projected thereto through the beam splitter BS onto a signal track of the disc, and a beam reflected from the portion of the signal track of the disc is converged passing sequentially through the beam splitter BS and the wolla stone prism WP to the sensor lens SL. The beam passing through the sensor lens SL is converted by the photo detector PD into electrical signals a,b,c,d,e and f.

At this time, the focus activator FA and the tracking activator TA move the object lens OL in the direction of tracking and/or focusing in order for the object lens OL to accurately converge the three beams.

That is, as shown in FIG. 2A, when the object lens OL projects the three beams onto a signal track of the disc, the main laser beam LB is positioned directly on a pit row of the signal track as shown in FIG. 2B, and the other two subbeams LBr, LBl are respectively positioned on the left and right sides of the main beam LB. At this time, assuming that a track pitch Tp denotes an intertrack distance, the pair of subbeams LBr, LBl are positioned to be 0.25 Tp away from the track, respectively.

As shown in FIG. 2C, the photo detector PD includes a main photo detecting element for detecting the amount of the reflected main laser beam LB and secondary photo detecting elements for detecting the reflected subbeams. At this time, the main photo detecting element is partitioned to form four photo detecting elements PDA-PDD, and the pair of secondary photo detecting elements PDE, PDF are respectively provided above and below the main photo detecting elements PDA-PDD.

The main photo detecting elements PDA-PDD of the photo detector PD detect the amount of reflected main laser beam LB to generate electrical signals a,b,c,d and the secondary photo detecting elements PDE, PDF detect the amount of the reflected subbeams LBr, LBl to generate electrical signals e,f.

The playback signal processor 5 receives the electrical signals a to f detected in the photo detector PD and obtains a radio frequency generating signal RF by summing the signals a through d (a+b+c+d). A focus control signal Fe is obtained using the equation (a+c)−(b+d), and by subtracting f from e (e−f), a tracking control signal Te is obtained.

The focus controller 6 operates the focus activator FA of the optical pick-up 3 in accordance with the focus control signal Fe output from the playback signal processor 5, and the tracking controller 7 operates the tracking activator TA of the optical pick-up 3 in accordance with the tracking control signal Te of the playback signal processor 5.

The channel bit signal processor 8 zero-crosses the radio frequency generating signal RF output from the playback signal processor 5 and converts the same into a round wave signal, to thereby detect the channel bit row signal CHBr and the channel bit synchronized signal SYNr. At this time, the channel bit row signal CHBr is decoded, error-corrected, converted into digital data in the digital signal processor 8 and processed according to various applications.

The motor control signal generator 11 generates a motor control signal Me by comparing the standard synchronized signal SYNs output from the standard clock signal generator 10 with the channel bit synchronized signal SYNr output from the channel bit signal processor 8, and in accordance with the motor control signal Me the motor controller 12 controls the motor 13 to thereby control the spinning speed of the optical disc 1.

In blank optical discs used for recording signals thereon, information signals such as channel bit signals are not recorded as in compact discs, but auxiliary signals are recorded thereon which is free-formatted according to a certain standard so as to control the tracking and the spinning speed of the optical disc. At this time, the free formatted auxiliary signals include a record signal, an address information signal for denoting the location of a corresponding track and a pilot signal for controlling the spinning speed of the disc. In this case, a track having lands and grooves is formed to control tracking, and tracking control signals are obtained therefrom.

The pilot signal having a certain cycle is recorded along the lands and grooves of the track, and the spinning speed of the disc is determined by detecting the cycle of a read pilot signal. In accordance with the determined spinning speed, data is recorded at a certain speed and density. In this case, random recording is possible because address information signals defining a serial location on the track are recorded.

In an orange book of the compact disc there is a standard for recording and playing spare signals free-formatted by a wobbling method in which, as shown in FIG. 3, a periodic wobbling in a free-formatted standard is applied to the lands or grooves of the track for denoting a pilot signal to detect the spinning speed of the disc and records an address information signal by phase-modulating the wobbling signal.

Then, data is recorded in the signal tracks having wobbled grooves and the main laser beam LB for reading the information is positioned on the signal track. The pair of subbeams LBr, LBl for detecting a tracking control signal are positioned on the left and right side from the main beam LB to thereby detect the beam reflected against the signal track.

Meanwhile, the technological developments of the optical disc and its player have been made to improve data storage capacity by resolving intertrack interference.

There are no problems when recording a wobbling signal on lands of a track by using a wobbling method, however, when recording information in the grooves of a track, problems due to undesired reading of different wobbling signals recorded on the lands next to a groove occur and a pilot signal for controlling the motor is not properly detected. Conversely, when recording a wobbling signal in a groove of the track, there also occurs a problem in recording information on a land of the track.

Therefore, a constant angle velocity CAV control method or a zoned CAV control method are recommended, but due to a low recording capacity these methods are known to be inappropriate for recording/playing a large amount of data which must be serially reproduced as in the case of video image data or voice data.

Further, when recording and using a free-formatted pilot signal on the disc, only a recording/playback apparatus having the proper pilot signal standard can be employed as an optical disc player and a recording capacity of a disc is restrictively confined by set standards.

SUMMARY OF THE INVENTION

Accordingly, it is an object of the present invention to provide an optical disc recording/playing apparatus and method thereof for recording and/or reproducing a data on/from the optical disc wherein the track of the disc is unwobbled and there is not recorded a free-formatted auxiliary signal such as a pilot signal and an address signal.

To achieve the above described object, the optical disc recording/playing apparatus includes: a record laser beam for recording a signal on a signal track of the disc; playback laser beams spaced from the record applied laser beam by a certain distance for thereby reading a signal recorded on the disc; an optical pick-up for projecting the laser beams; a playback signal processor for receiving a playback signal output from the optical pick-up and generating a tracking control signal, a focusing control signal and a radio frequency signal; and a focusing and a tracking controller for performing a focusing and a tracking operation in accordance with a focusing and a tracking control signal output from the playback signal processor.

Further, the optical laser disc recording/playing apparatus, wherein the optical disc includes a spiral track thereon having a land and groove structure and the track is unwobbled and there is not recorded a free-formatted pilot signal for controlling a spinning rate of the disc, includes: an optical pick-up for recording or playing-back a data on or from a signal track of the disc by using a first, a second and a third laser beam which are multipled by a grating; a playback signal processor for generating a focusing control signal, a tracking control signal and a first radio frequency signal in accordance with a signal reproduced in the optical pick-up through the first laser beam; a first signal shaper for removing a signal which is light-modulated by shaping a radio frequency signal reproduced by the second laser beam in the optical pick-up, and generating a second radio frequency signal; a second signal shaper for removing a signal which is light-modulated by shaping a radio frequency signal reproduced by the third laser beam in the optical pick-up, and generating a third radio frequency signal; a radio frequency signal detector for detecting a third radio frequency signal output from the second signal shaper; a microcomputer for receiving the output of the radio frequency signal detector and determining whether the received signal is an initial recording carried out on a blank track of the disc or a second recording carried out on a recorded track of the disc to thereby control the disc player system; a playback signal selector for generating one selected from the second and the third radio frequency signal output from the first and the second shaper, in accordance with a control signal of the microcomputer; a channel bit signal processor for processing the radio frequency signal selected from the playback signal selector and generating a playback channel bit signal, a playback channel bit synchronous signal and a playback channel bit clock signal; a digital signal processor for decoding and error-correcting the detected channel bit signal, and generating a playback data; a standard clock signal generator for generating a standard clock signal and a standard synchronous signal; a playback motor control signal detector for comparing the standard synchronous signal output from the standard clock signal generator with the playback channel bit synchronous signal output from the channel bit signal processor and detecting a playback motor control signal; a record motor control signal detector for receiving the second radio frequency signal from the first signal shaper, the playback channel bit signal and the playback channel bit clock signal from the channel bit signal processor, and detecting a record motor control signal; a motor control signal selector for receiving one selected from the playback motor control signal output from the playback motor control signal detector and the record motor control signal output from the record motor control signal detector, and generating a motor control signal, in accordance with the control of the microcomputer; a synchronous delay unit for delaying the playback channel bit synchronous signal output from the channel bit signal processor and generating a delay synchronous signal; a record clock selector for receiving one selected from the standard clock signal output from the standard clock generator and the playback channel bit clock signal output from the channel bit signal processor, and generating a record clock signal, in accordance with the control of the microcomputer; a record digital signal processor for coding and decoding a record data; a channel bit processing transfer unit for adding the delay synchronous signal and an address signal to the output of the record digital signal processor and generating a record channel bit signal according to the record clock signal, in accordance with the control of the microcomputer; a first light stabilizing modulator for controlling the amount of the first laser beam output from the optical pick-up so as to correspond to the record channel bit signal output from the channel bit processing transfer unit, in accordance with the control of the microcomputer; and a second light stabilizer for controlling the amount of the laser beam output from the optical pick-up and applying the light amount signal to the first and the second signal shaper, in accordance with the control of the microcomputer.

Still further, the optical disc recording/playing method, wherein the optical disc includes a spiral track thereon having a land and groove structure and the track is unwobbled and there is not recorded a free-formatted pilot signal for controlling a spinning rate of the disc, comprising the steps of: judging whether to record a data on the disc or reproduce a data recorded on the disc; controlling, when reproducing a signal recorded on the disc, the light stabilizing modulator to thereby adjust the laser diode to have a light amount at a read mode, and turning off the laser diode by controlling the light stabilizing modulator; selecting the first radio frequency signal output from a photo detector by controlling a playback signal selector and the playback motor control signal output from the playback motor control signal detector by controlling a motor control signal selector, thereby controlling a motor; and decoding and error-correcting the playback channel bit signal output from the channel bit signal processor and generating a playback data to thereby read a data recorded on the disc.

Furthermore, the optical disc recording/playing method, wherein the optical disc includes a spiral track thereon having a land and groove structure and the track is unwobbled and there is not recorded a free-formatted pilot signal for controlling a spinning rate of the disc, comprising the steps of: judging whether to record a data on the disc or reproduce a data recorded on the disc; adjusting, when recording a data, the laser diode to have a light amount at a read mode by controlling the light stabilizing modulator, detecting a radio frequency signal, and judging whether the recording is an initial recording on a blank disc or a second recording on a recorded disc; adjusting, when recording a data on a blank disc, the first laser diode to have a light amount at a write mode by controlling the light stabilizing modulator, and controlling the second laser diode to turn to a light amount at a read mode; selecting a second radio frequency signal from the playback signal selector, controlling the motor control signal selector to select a motor control signal in accordance with the record motor control signal, and selecting a standard clock signal in accordance with the record clock signal; processing a record data to an appropriate format by controlling the channel bit processing transfer unit 120, applying a record channel bit signal to the light stabilizing modulator in accordance with the record clock signal, and controlling a light amount emitted from the first laser diode, thereby recording a signal; adjusting, when recording a data on a record disc, the first laser diode to have a light amount at a read mode by controlling the light stabilizing modulator, and controlling the second laser diode to turn to a light amount at a write mode; selecting a first radio frequency signal from the playback signal selector, controlling the motor control signal selector to select a motor control signal in accordance with the record motor control signal, and selecting a standard clock signal in accordance with the record clock signal; processing a record data to an appropriate format by controlling the channel bit processing transfer unit, applying a record channel bit signal to the light stabilizing modulator in accordance with the record clock signal, and controlling the first laser diode, thereby recording a signal.

BRIEF DESCRIPTION OF THE DRAWINGS

FIGS. 10A–10F are timing diagrams for each portion in FIG. 9;

DETAILED DESCRIPTION OF THE PREFERRED EMBODIMENTS

Figure 1:
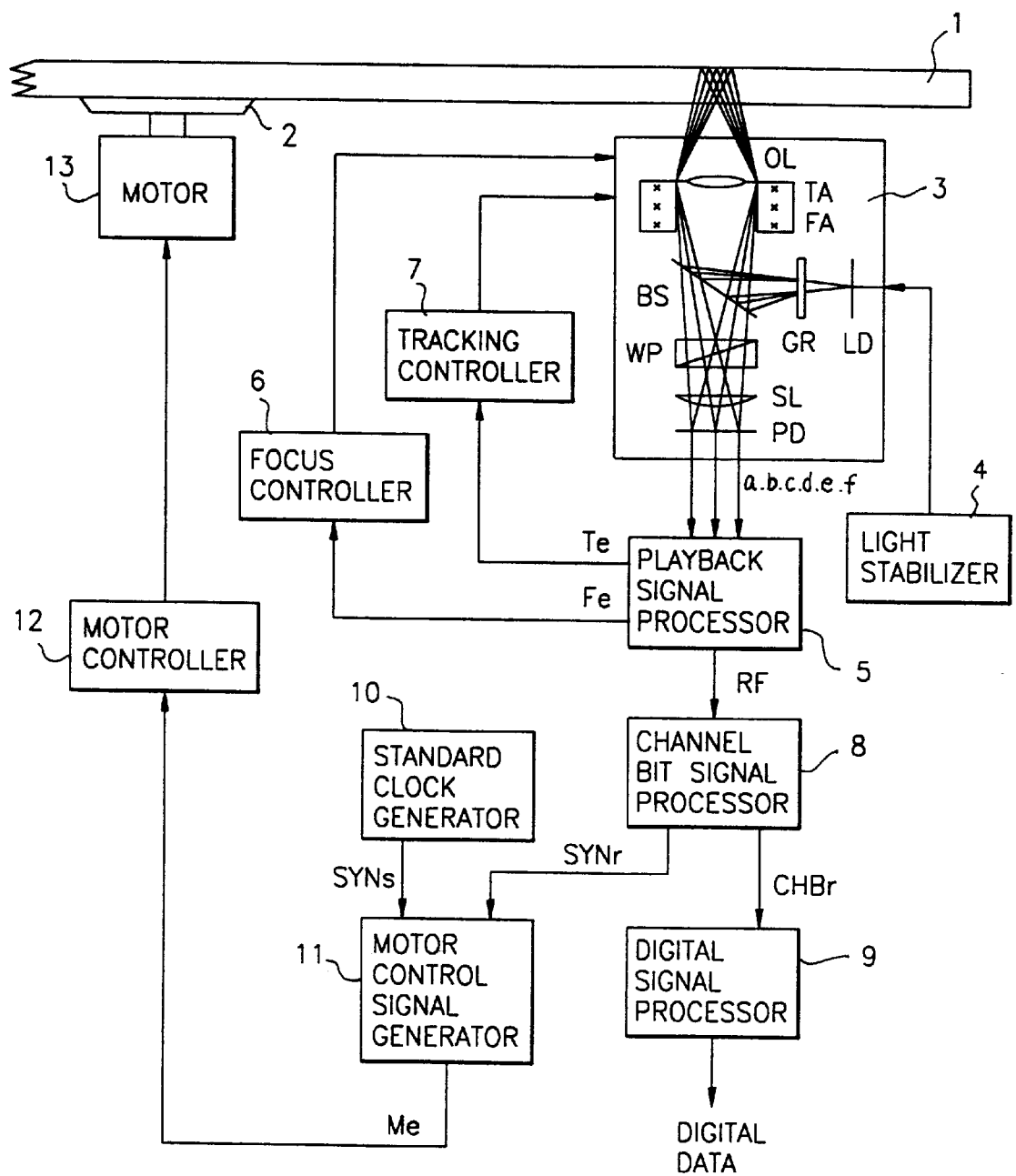
FIG. 1 is a block diagram of a conventional laser disc recording/playing apparatus.
Figure 2A:
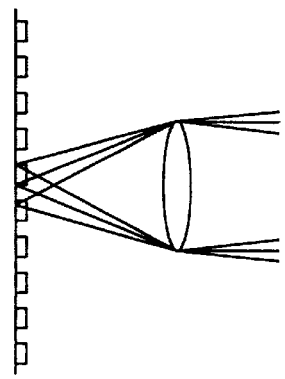
FIGS. 2A–2C are structural views of an array of three beams converged via an object lens and a photo detector.
Figure 2B:
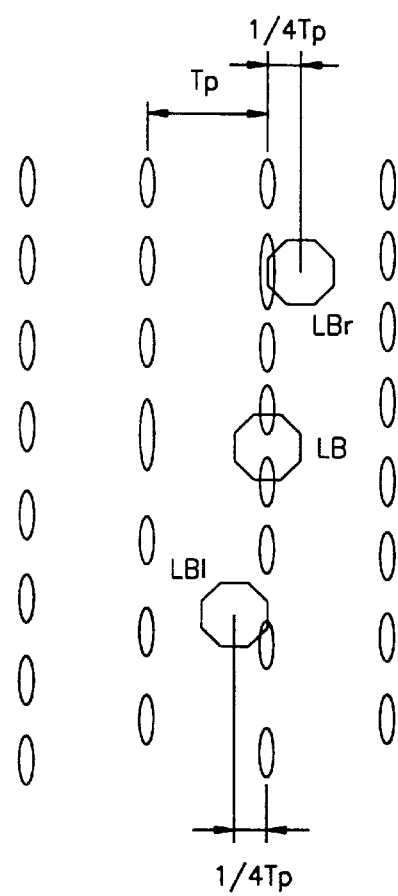
Figure 2C:
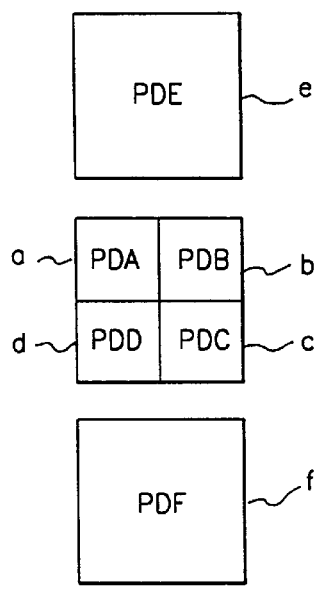
Figure 3:
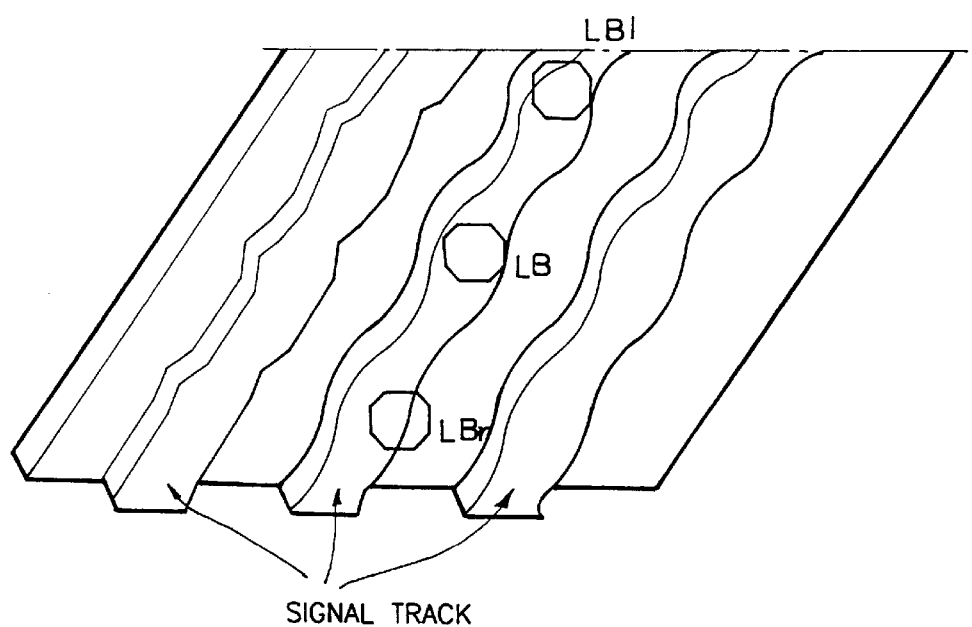
FIG. 3 is a partial view of an optical disc having a wobbling structure and showing a laser beam array thereon.
Figure 4:
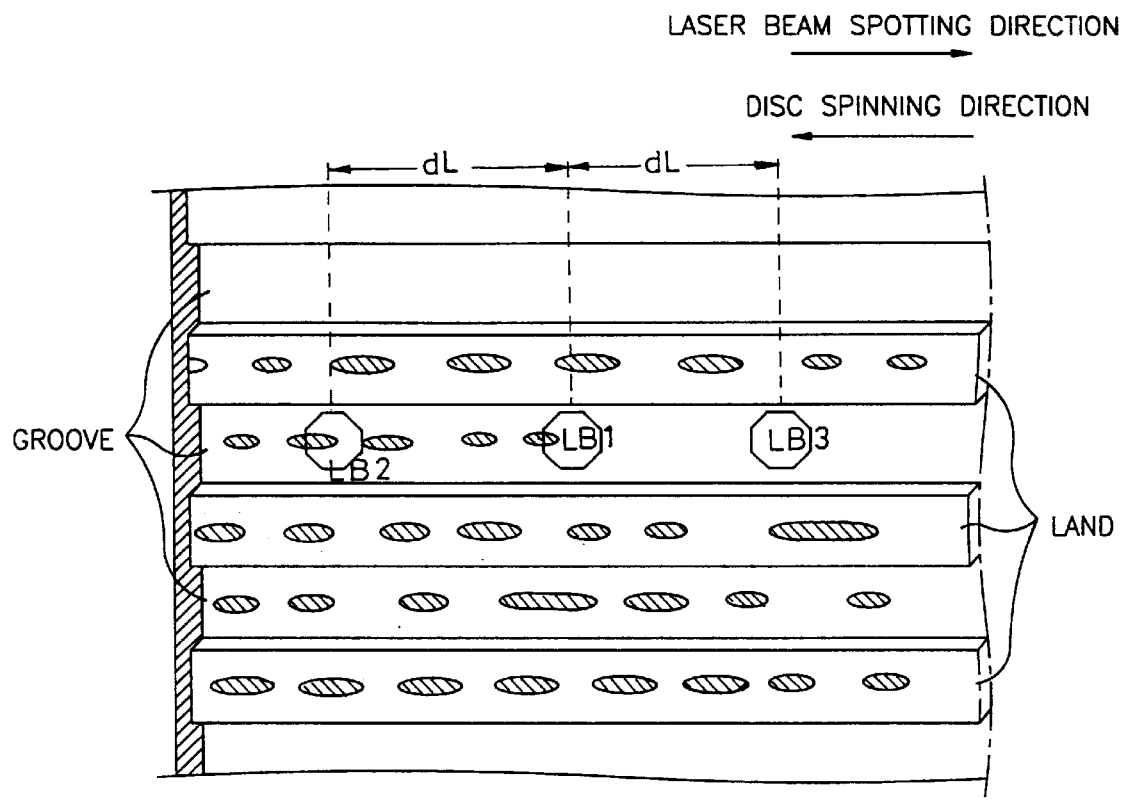
FIG. 4 is a partial view showing a track structure of an optical disc according to the present invention.

As shown in FIG. 4, along the surface of an optical disc applicable to the present invention there is formed a spiral track having an unwobbled land and groove structure, wherein there is not recorded a free-formatted pilot signal which is provided to control a spinning rate of the disc.

A plurality of laser beam spots are-positioned along a track of the disc having a certain distance from each of the spots. That is, a laser beam spot LB1 for recording, and one laser beam LB2 or two laser beams LB2, LB3 for playing-back are spotted on a track turing against the spinning direction of the disc.

In a case that there are provided a pair of playback laser beams, the pair of beam spots LB2, LB3 are spotted on a rear and a front portion of the track, respectively, while spacing by a certain distance dL from the record laser beam spot LB1. Here, a previously recorded data is read according to the laser beam LB3 and a data recorded by the beam LB1 is read according to the laser beam LB2.

In another case that there is provided one laser beam for playing-back, the playback laser beam LB2 is spotted behind the record laser beam spot LB1 and spaced by a certain distance dL from the beam spot LB1 to thereby read data recorded on a signal track by the record laser beam LB1.

That is, on a rear portion of the record beam spot LB1 the playback laser beam LB2 reads data recorded on the disc by the record beam LB1, and the playback laser beam LB3 reads a previously recorded data. Here, the record beam LB1 enables a new data to be recorded on a previously recorded old data.

Recording a data on a blank optical disc will now be described.

Data is recorded on the blank disc by the record laser beam LB1 in accordance with a focus control and a tracking control of an optical pick-up. Here, the tracking control according to a single beam push-pull method is available, because the focus control employs a flying spot astigmation method and there is provided a land and groove structure along the signal track of the disc.

The data recorded by the record beam LB1 is read by a playback laser beam LB2 which comes behind the record beam LB1 on a signal track of an optical disc with a certain distance dL therefrom. Here, a magnitude Sp of the converged record laser beam LB1 and the playback laser beams LB2, LB3 can be incorporated in a following expression (1).

$$Sp = k * \lambda / N_A \quad (1),$$

wherein $\lambda$: wavelength of a laser beam;

$N_A$: numerical aperture in an object lens; and k: a constant determined according to an optical distribution at a numerical aperture of an object lens.

Therefore, when a signal pit is read by a laser beam, the magnitude of an electrical signal reproduced becomes variable depending on the magnitude of a signal pit.

Figure 5:
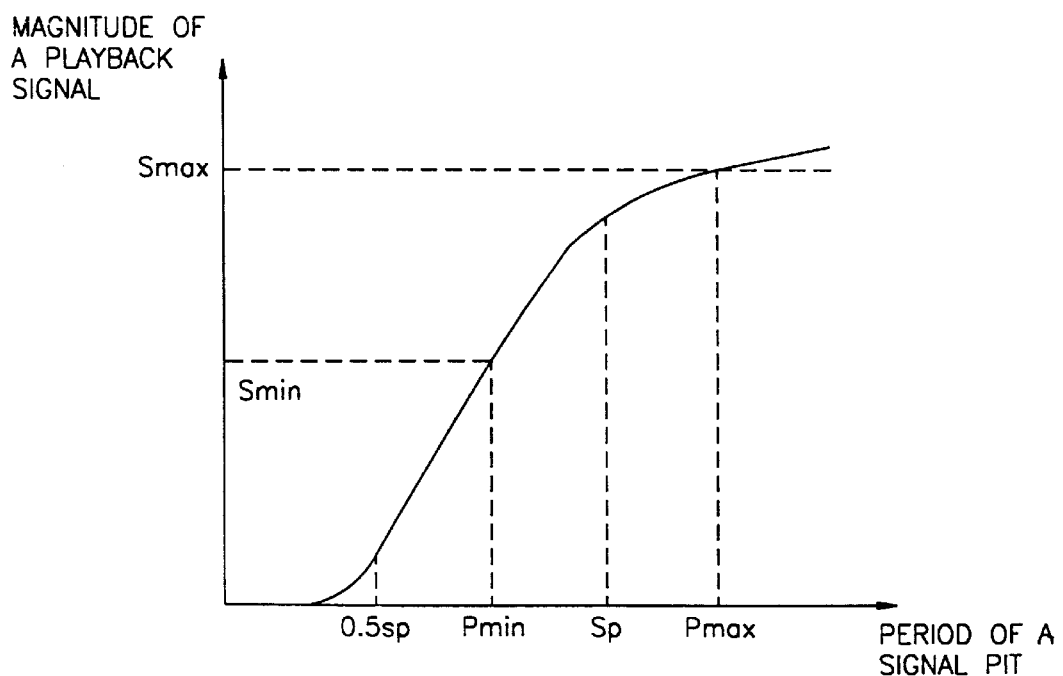
FIG. 5 is a graph for showing magnitude of a playback signal in accordance with the period of a signal pit of an optical disc.

As shown in FIG. 5, when the period of a signal pit is less than a half the magnitude Sp of the laser beam, that is, less than 0.5Sp, the playback signal becomes smaller. when the period of a signal pit is larger than Sp, the playback signal becomes maximized, thus to be less influenced by a period variation of a signal pit. However, when the period of a signal pit is larger than 0.5Sp and less than Sp, the playback signal shows a significant change according to the period variation of the signal pit.

A spatial period P of a signal pit recorded in the disc is proportionate to a disc scanning velocity, that is, a linear velocity, as shown in a following expression (2).

$$P = T * V \quad (2)$$

(here, T: a period of a signal recorded by the record laser beam LB1)

When a disc scanning velocity of the record laser beam LB1 shows a normal scanning velocity Vn, and a magnitude of a record signal read by a playback beam LB2 is Smin compared against a minimal signal pit period Pmin, the disc scanning velocity becomes larger than a normal scanning velocity, that is, the linear velocity Vn so that when the signal pit period P becomes larger than the preset minimal signal pit period Pmin the magnitude of a signal reproduced by the playback laser beam LB2 also becomes larger than Smin.

Meanwhile, when the disc scanning velocity is less than a normal scanning velocity, that is, a linear velocity Vn, and thus a record signal pit period P is smaller than a preset minimal signal pit period Pmon, the magnitude of a signal reproduced by the playback laser beam LB2 becomes smaller than Smin.

Accordingly, a spinning rate of an optical disc can be determined by detecting the magnitude of a playback signal reproduced by the playback beam LB2 so that a spinning rate of the optical disc can be controlled to maintain a constant magnitude of the playback signal for data recording.

Also, assuming that dT denotes a delay time between a data which is a record channel bit signal recorded by the recording beam LB1 and a data which is a record channel bit signal reproduced by the playback laser beam LB2, a linear velocity V serving as a scanning velocity of the record beam LB1 is incorporated in an expression (3) as follows.

$$V = dL/dT \qquad (3)$$

By the expression (3), a delay time dT is detected between the record channel bit signal serving as a recording signal and a playing channel bit signal to thereby determine a spinning rate of the laser disc.

An expression (4) is also provided to obtain a delay time dT for controlling a disc spinning rate so as to record an information signal.

$$dTn = dL/Vn \qquad (4)$$

By the expressions (3) and (4), a delay time is detected which occurs between the record channel bit signal recorded by the record beam LB1 and the playback channel bit signal reproduced by the playback beam LB2 to thereby determine and control the spinning rate of the disc.

As in the previous description, to record a data in an optical disc, a record signal is decoded into a channel bit row signal appropriate to recording and playing-back, and a synchronous signal is periodically inserted in a side of the channel bit row to improve reproducibility and enables a random reproduction by inserting serial address signals.

To record data in a pre-recorded disc, the previous recorded data is read by the playback laser beam LB3 and the read playback signal is processed to thereby detect a clock signal and a synchronized signal for a channel bit signal.

The detected playback clock signal or the playback synchronized signal is compared with a standard clock signal or a standard synchronized signal to thereby determine and control a disc rotation speed, and then a new data is recorded by the record beam LB1 according to the disc spinning rate. That is, the disc spinning rate is controlled by a playback clock signal or a playback synchronized signal detected from a channel bit signal reproduced by the playback laser beam LB3.

Also, to lead a new data recorded on an old data in the disc to be consecutively connected to the previous record signal and the previously synchronized signal and to lead serially recorded address signals to be recorded in a desired location regardless of repeated previous recording operation, a synchronized signal or an address signal detected from a signal reproduced by the playback laser beam LB3 is delayed for a certain time to perform a re-recording. That is, the synchronized signal or an address signal detected from a signal reproduced by the playing laser beam LB3 is delayed for a certain time so as to be re-recorded in the form of a synchronized signal and an address signal for a signal recorded by the record beam LB1.

Figure 6:
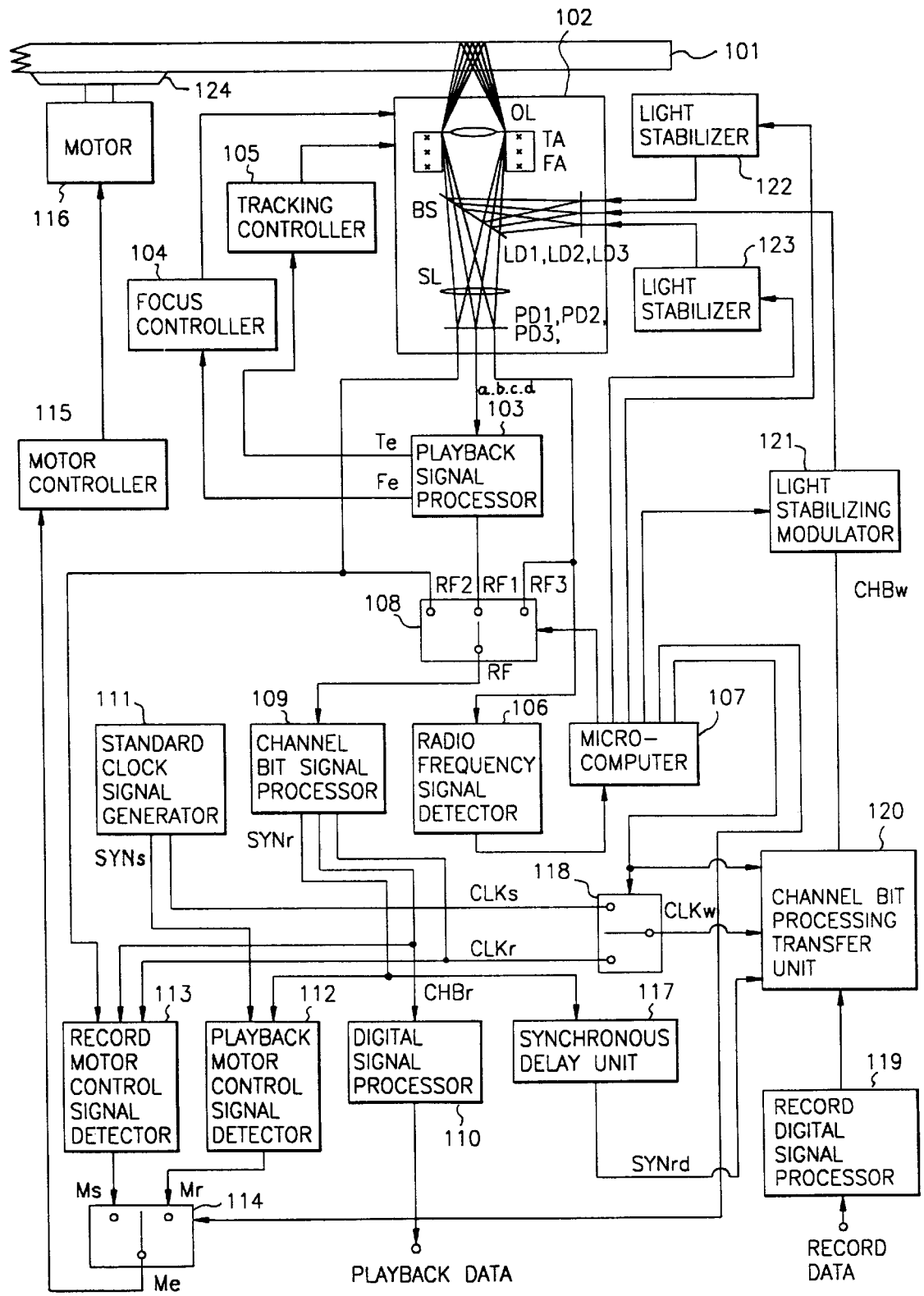
FIG. 6 is a view showing a land and groove structure of an optical disc recording/playing apparatus according to a first embodiment of the present invention.

With reference to FIG. 6, a laser disc recording/playing apparatus according to the first embodiment of the present invention includes: a turntable 124 which accommodates an optical disc 101 placed thereon; an optical pick-up 102 for projecting a laser beam to the optical disc 101, detecting the laser beam reflected against the optical disc 101, and generating electrical signals a, b, c and d and radio frequency generating signals RF2 and RF3; a playback signal processor 103 for receiving the electrical signals a–d from the optical pick-up 102 and generating a focus control signal Fe, a tracking control signal Te and a radio frequency generating signal RF1; a focusing controller 104 for performing a focus control of the optical pick-up 102 in accordance with the focus control signal Fe output from the playback signal processor 103; a tracking controller 105 for performing a tracking control of the optical pick-up 102 in accordance with the tracking control signal Te output from the playback signal processor 103; a radio frequency signal detector 106 for detecting the radio frequency generating signal RF3 output from the optical pick-up 102; a microcomputer 107 for receiving the output from the high frequency detector 106 and determining whether there is a previously recorded data in the disc to thereby control the disc player system; a playback signal selector 108 for generating a signal selected from the radio frequency generating signal RF1 output from the playback signal processor 103 in accordance with a control signal of the microcomputer 107 and the radio frequency signals RF2 and RF3 output from the optical pick-up 102; a channel bit signal processor 109 for processing the radio frequency generating signal RF output from the playback signal selector 108 and generating a playback channel bit signal CHBr, a playback channel bit synchronized signal SYNr and a playback channel bit clock signal CLKr; a digital signal processor 110 for decoding the detected channel bit row signal CHBr, error-correcting and generating the playback data; a standard clock signal generator 111 for generating a standard clock signal CLKs and a standard synchronized signal SYNs; a playback motor control signal detector 112 for comparing the standard synchronized signal SYNs output from the standard clock signal generator 111 with the playback channel bit synchronized signal SYNr output from the channel bit signal processor 109 and detecting a playback motor control signal Mr; a record motor control signal detector 113 for receiving the radio frequency generating signal RF2 output from the optical pickup 102, the playback channel bit signal CHBr output from the channel bit signal processor 109 and the playback channel bit clock signal CLKr, and detecting a record motor control signal Ms; a motor control signal selector 114 for selecting a signal from the playback motor control signal Mr output from the playback motor control signal detector 112 and the record motor control signal Ms output from the record motor control signal detector 113, and generating a motor control signal Me, in accordance with the control of the microcomputer 107; a motor controller 115 for controlling a motor according to the motor control signal Me output from the motor control signal selector 114; a synchronous delay unit 117 for delaying the playback channel bit synchronous signal SYNr output from the channel bit signal processor 109 and generating a delay synchronous signal SYNrd; a record clock selector 118 for generating a record clock signal CLKw by selecting a signal from the standard clock signal CLKs output from the standard clock generator 111 and the playback channel bit clock signal CLKr output from the channel bit signal processor 109, in accordance with the microcomputer 107; a record digital signal processor 119 for coding and decoding a record data; a channel bit processing transfer unit 120 for adding to the output of the record digital signal processor 119 the delay synchronous signal SYNrd and an address signal in accordance with the control of the microcomputer 107 and generating a record channel bit signal CHBw in accordance with the record clock signal CLKw; light stabilizing modulator 121 for controlling the amount of the laser beam LB1 output from the optical pickup in correspondence with the record channel bit signal CHBw output from the channel bit processing transfer unit 120, in accordance with the control of the microcomputer 107; and a pair of light stabilizers 122, 123 for respectively controlling the amount of a corresponding one of the laser beams LB2, LB3 output from the optical pick-up, in accordance with the control of the microcomputer 107.

The optical pick-up 102 includes: a laser diode LD1 for generating a laser beam LB1 in accordance with the control of the light stabilizing modulator 121; a laser diode LD2 for generating a laser beam LB2 in accordance with the control of the light stabilizer 122; a laser diode LD3 for generating a laser beam LB3 in accordance with the control of the light stabilizer 123; a beam splitter BS for reflecting the three beams LB1, LB2 and LB3 each generated from the laser diodes LD1, LD2 and LD3; an object lens OL for converging the three laser beams reflected from the beam splitter BS onto a portion of a signal track of the disc; a focus activator FA and a tracking activator TA for moving the object lens OL in the direction of tracking and/or focusing so that the object lens OL can accurately converge the three laser beams onto a signal track of the disc; a sensor lens SL for converging a beam reflected against the optical disc; and three photo detectors PD1, PD2 and PD3 for detecting laser beam converged by the sensor lens SL and generating in the form of electrical signals which are proportionate to an amount of laser beam.

Figure 7:
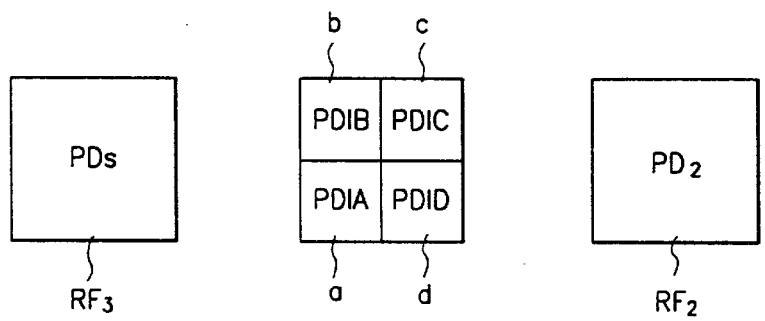
FIG. 7 is a structural view of a photo detector in FIG. 6.

As shown in FIG. 7, the photo detector PD1 is partitioned to form four photo detecting elements PD1A, PD1B, PD1C and PD1D, and the pair of secondary photo detecting elements PD2, PD3 are respectively provided on a left and a right side of the photo detector PD1.

With reference to the accompanying drawings, the thusly composed optical disc recording/playing apparatus will now be described in accordance with the first embodiment of the present invention.

On the turntable 124, as shown in FIG. 4, there is provided the free-formatted optical disc 101 having a land and groove structure along a track thereon. The turntable 124 controls a spinning rate of the disc 101 by controlling the rotation speed of the motor 116.

The three laser beams LB1, LB2 and LB3 each generated from the three laser diodes LD1, LD2 and LD3 are reflected from the beam splitter BS and converged by the object lens, and the converged three beams are projected on a track of the disc as shown in FIG. 4. The beams reflected against a signal surface of the disc 101 pass sequentially through the object lens OL and the beam splitter BS and are converged into the the sensor lens SL. The converged beams are applied to the three photo detectors PD1–PD3 to result in generating electrical signals which are proportionate to the applied light amount.

At this time, the focus activator FA moves the object lens up and down, that is, along the axis thereof to thereby maintain a constant distance between the object lens OL and the disc 101 and obtain an optimal convergence. The tracking activator TA moves the object lens OL radially along the disc, so that the converged laser beam spots can be positioned along a central line of the signal track.

The electrical signals a–d output from the four photo detecting elements PD1A–PD1D of the photo detector PD1 are summed (a+b+c+d) in the playback signal processor 103 and sent therefrom in the form of a radio frequency generating signal RF1. Also, the resultant of (a+c)−(b+d) is output therefrom in the form of a focus control signal Fe, and by (a+b)−(c+d) a tracking control signal Te is output.

The photo detectors PD2, PD3 each detect radio frequency generating signals RF2, RF3 from the laser beams LB2, LB3 and output the same.

Therefore, the focus controller 104 and the tracking controller 105 each control the focus activator FA and the tracking activator Ta of the optical pick-up 102 in accordance with the focus control signal Fe and the tracking control signal Te output from the playback signal processor 103.

Here, a playing-back operation of a signal recorded in the optical disc 101 will be explained as follows.

The light stabilizing modulator 121 drives the laser diode LD1 to generate a certain amount of laser beam, in accordance with the control of the microcomputer 107.

At this time, the light stabilizers 122, 123 control the laser diodes LD2, LD3 to have the value "0" of a laser output, in accordance with the control of the microcomputer 107.

The laser beam LB1 from the laser diode LD1 passes through the beam splitter BS and the object lens OL and is placed on a signal track of the disc 101, and the beam reflected against the signal surface of the disc 101 passes through the object lens OL, the beam splitter BS and the sensor lens SL and is converged. As a result, the photo detector PD1 outputs electrical signals a–d proportionately to the incident light amount.

The playback signal processor 103 receives the electrical signals a–d and generates the radio frequency generating signal RF1, the focus control signal Fe and the tracking control signal Te. The playback signal selector 108 selects a radio frequency generating signal RF1 detected from the photo detector PD1, in accordance with the control of the microcomputer 107.

The selected radio frequency generating signal RF1 is detected as a playback channel bit signal CHBr in the channel bit signal processor 109, from which the playback channel bit synchronous signal SYNr and a clock signal CLKr are detected respectively.

At this time, the playback channel bit synchronous signal SYNr output from the channel bit signal processor 109 is applied along with the standard synchronous signal SYNs output from the standard clock generator 111 to the playback motor control signal detector 112 to thereby output the playback motor control signal Mr. The motor control signal selector 114 outputs the playback motor control signal Mr in the form of a motor control signal Mc to thereby control the spinning rate of the disc 101, in accordance with the control of the microcomputer 107.

The playback channel bit signal CHBr output from the channel bit signal processor 109 is decoded and error-corrected in the digital signal processor 110 and output therefrom.

The operation of recording a signal on the optical disc will be described.

In accordance with the control of the microcomputer 107, the light stabilizer 123 controls the laser diode LD3 to output a playback light amount, and the photo detector PD3 detects a radio frequency generating signal RF3 from a laser beam reflected from the disc.

The detected radio frequency playback signal RF3 passes through the radio frequency signal detector 106 and applied to the microcomputer 107 which in turn judges whether the disc 101 is data-recorded or blank in accordance with a detection signal of the radio frequency signal detector 106.

That is, because the laser beam LB3 output from the laser diode LD3 is placed in front of the record beam LB1 on a track of the disc, if a radio frequency signal RF3 is detected from the photo detector PD3 which detects a reflected beam of the laser beam LB3, the optical disc 101 is data-recorded, and if the radio frequency signal RF3 is not detected, the disc 101 is blank, that is, data-free.

When a data signal is previously recorded in the disc 101, the playback signal selector 108 selectively outputs the radio frequency signal RF3 output from the photo detector PD3 in accordance with the control of the microcomputer 107, and the channel bit signal processor 109 detects from the radio frequency generating signal RF3 the playback channel bit signal CHBr, the playback channel bit synchronous signal SYNr and a clock signal CLKr, respectively.

Here, the record clock selector 118 selects the playback channel bit clock signal CLKr output from the channel bit signal processor 109 and outputs a record clock signal CLKw to the channel bit processing transfer unit 120, and the synchronous delay unit 117 delays for a certain time the playback channel bit synchronous signal SYNr output from the channel bit signal processor 109 and outputs a delay synchronous signal SYNrd.

The applied record data is processed using a proper format in the record signal processor 119, and an error-correction detecting code is added thereto and coded into a signal which is appropriate to be recorded in the disc 101. In accordance with the control of the microcomputer 107, the channel bit processing transfer unit 120 adds to the output of the record digital signal processor 119 the delay synchronous signal and an address signal output from the synchronous delay unit 117 and outputs the channel bit signal CHBw to the light stabilizing modulator 121 according to the record clock signal CLKw.

Then, the light stabilizing modulator 121 controls the amount of light emitted from the laser diode LD1 according to the record channel bit signal CHBw, thereby recording a signal on a track of the disc 101.

The playback motor control signal detector 112 outputs a playback motor control signal Mr according to a playback channel bit synchronous signal SYNr output from the channel bit signal processor 109 and a standard synchronous signal SYNs output from the standard clock signal generator 111, and in accordance with the control of the microcomputer 107 the motor control signal selector 114 outputs a motor control signal Me from the playback motor control signal Mr to thereby control a spinning rate of the optical disc 101.

When the disc 101 is previously data-recorded, a new data is recorded on the old data by adjusting a position of the synchronous signal to the old data density. At this time, the laser diode LD2 has a beam output value "0" in accordance with the control of the light stabilizer 122.

Meanwhile, when the disc 101 is provided for an initial recording, that is, blank and data-free, the playback signal selector 108 selectively outputs the radio frequency generating signal RF2 output from the photo detector PD2 in accordance with the control of the microcomputer 107, and the channel bit signal processor 109 detects a playback channel bit signal CHBr, a playback channel bit synchronous signal SYNr and a clock signal CLKr in accordance with the radio frequency generating signal RF2.

That is, a signal is recorded by the laser beam LB1 in accordance with the laser diode LD1, a radio frequency generating signal RF2 is obtained by the laser beam LB2 delayed for a certain distance dL and a certain time dTn from the beam LB1, and by processing the radio frequency generating signal RF2 a playback channel bit signal CHBr and a channel bit clock signal CLKr are obtained.

The record clock selector 118 selects the standard clock signal CLKs output from the standard clock generator 111 in accordance with the control of the microcomputer 107 and outputs a record clock signal CLKw to the channel bit processing transfer unit 120.

A record data is output from the record digital signal processor 119 in the form of a signal appropriate to record in the disc 101, and the channel bit processing transfer unit 120 adds a synchronous signal and an address signal to the output of the digital signal processor 111 in accordance with the control of the microcomputer 107, generates a record channel bit signal CHBw and outputs the signal CHBw to the light stabilizer 121 in accordance with the record clock signal CLKw. At this time, the synchronous signal is generated in the channel bit processing transfer unit 120 in accordance with the control of the microcomputer 107.

Then, the light stabilizing modulator 121 controls the light amount of the laser diode LD1 to thus record a signal on the track of the disc 101.

The record motor control signal detector 113 processes the playback channel bit clock signal CLKr output from the channel bit signal processor 109 and the radio frequency generating signal RF2 output from the playback signal selector 108, and outputs a record motor control signal Ms. The motor control signal selector 118 outputs the record motor control signal Ms in the form of a motor control signal Me in accordance with the control of the microcomputer 107 so as to control a spinning rate of the disc 101.

The playback channel bit synchronous signal SYNr reproduced in the channel bit signal processor 109 together with the standard synchronous signal SYNs output from the standard clock generator 111 is applied to the playback motor control signal detector 112 to be thereby employed to output a playback motor control signal Mr.

When the disc 101 is not data-recorded, that is, data-free, the microcomputer 107 controls the light stabilizer 123 to thus lead to a light amount "0" of the laser diode LD3.

Figure 8:
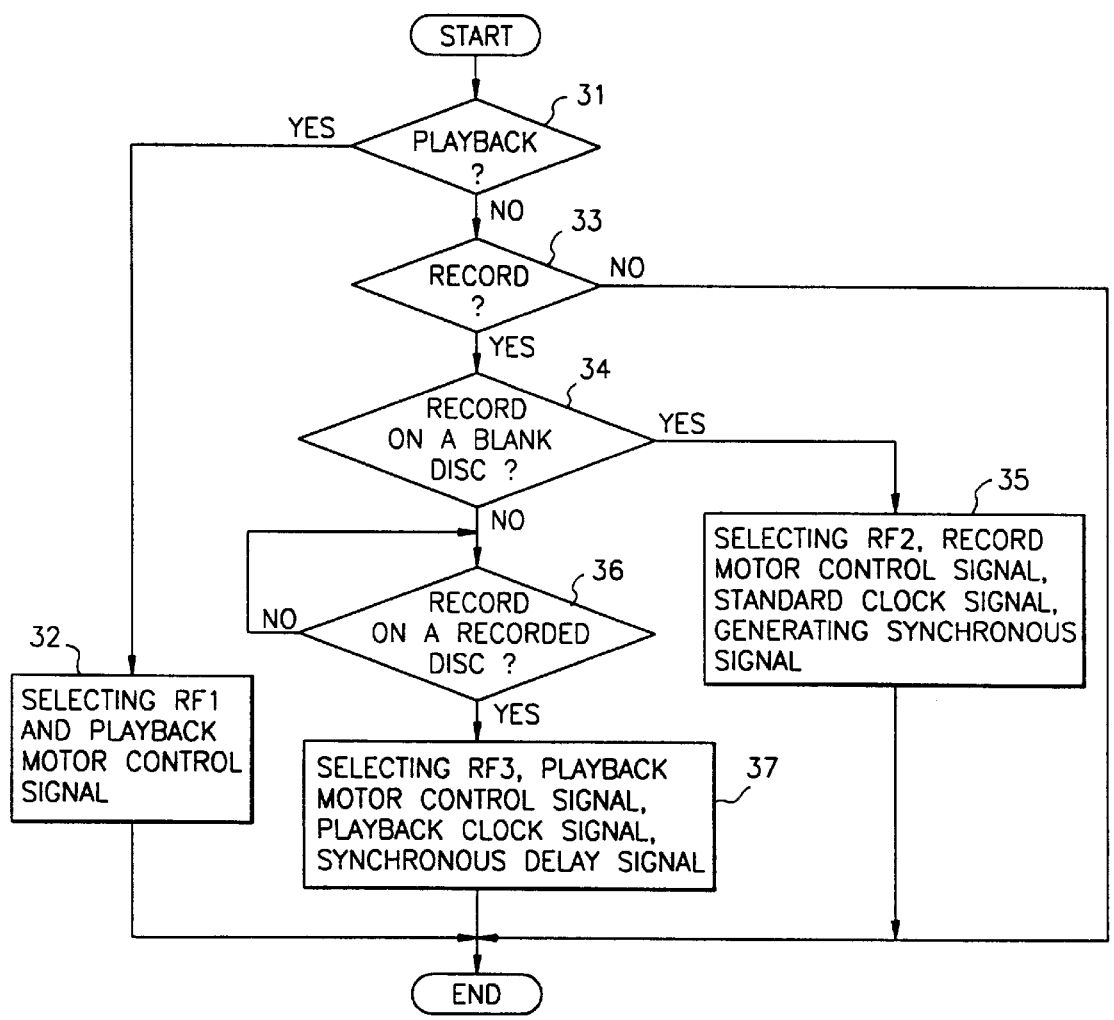
FIG. 8 is a flow chart showing operation of a microcomputer for controlling the operation of FIG. 6.

With reference to FIG. 8, the operation of the microcomputer 107 will now be described.

Initially, when playing-back a signal recorded in the disc 101, the microcomputer 107 controls a playback signal selector 108, selects the radio frequency generating signal RF1 output from the photo detector PD1, controls the motor control signal selector 114, selects the playback motor control signal Mr output from the playback motor control signal detector 112, and controls the motor 116.(31, 32)

When recording a signal in the disc 101, by using the output of the radio frequency signal detector 106 the signal is judged whether it is initially being recorded. (33, 34)

In the case of an initial recording, the playback signal selector 108 is controlled to select the radio frequency generating signal RF2 output from the photo detector PD2. The motor control signal selector 114 is controlled to select the record motor control signal Ms output from the record motor control signal detector 113 to thus control the motor 116. The record clock selector 118 is controlled to select the standard clock signal CLKs output from the standard clock generator 111. The channel bit processing transfer unit 120 is controlled so that an externally applied synchronous signal is ignored and an internal synchronous signal is generated. (35)

If the recording is judged to be a re-recording, the playback signal selector 108 is controlled to select the radio frequency generating signal RF3 output from the photo detector PD3. The motor control signal selector 114 is controlled to select the playback motor control signal Mr output from the playback motor control signal detector 112 to thus control the motor 116. The record clock selector 118 is controlled to select the playback channel bit clock signal CLKr output from the channel bit signal processor 109. The channel bit processing transfer unit 120 is controlled to employ the delay synchronous signal SYNrd output from the synchronous delay unit 117. (36, 37)

A detailed composition of the optical disc recording/playing apparatus of FIG. 6 according to the present invention will be explained as follows.

Figure 9:
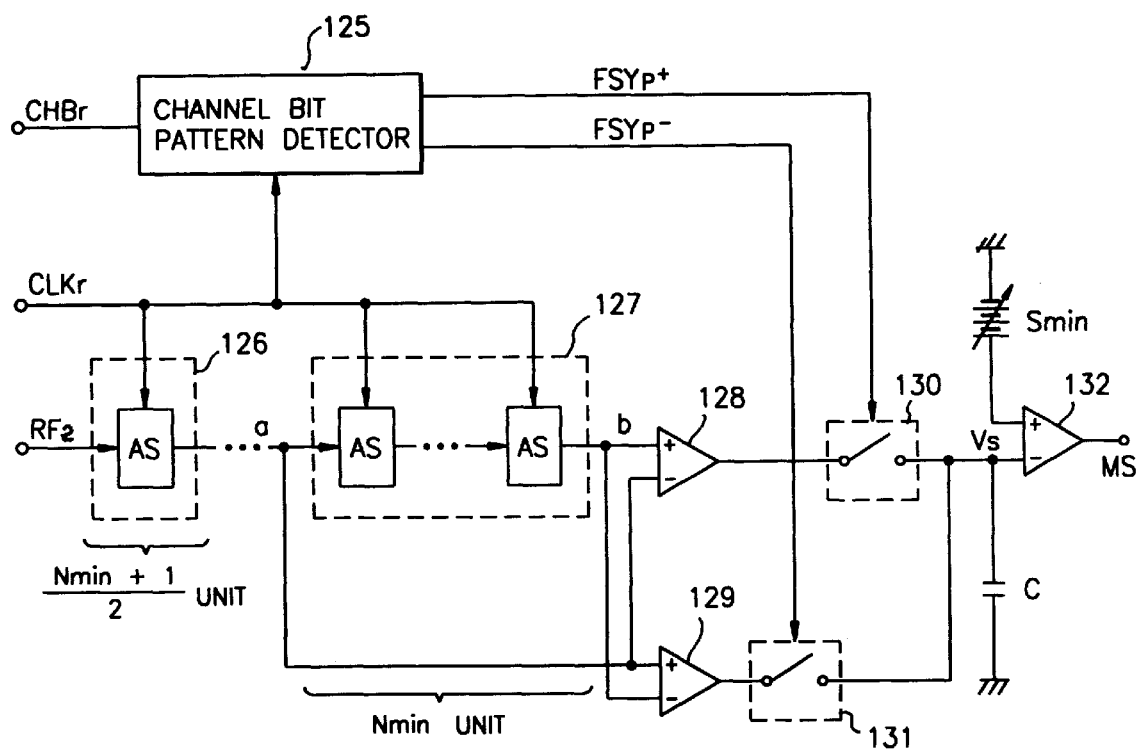
FIG. 9 is a block diagram showing a first embodiment of a record motor control signal detector in FIG. 6 according to the present invention.

As shown in FIG. 9, the first embodiment of the record motor control signal detector 113 includes: a channel bit pattern detector 125 for detecting from the playback channel bit signal CHBr a positive high frequency pattern detecting signal FSYp+ and a negative high frequency pattern detecting signal FSYp−, in accordance with the playback channel bit clock signal CLKr output from the channel bit signal processor 109; an analog shifter 126 for analog-shifting the radio frequency generating signal RF2 output from the optical pickup 102 in accordance with the playback channel bit clock signal CLKr; an analog shift unit 127 for analog-shifting the signal output from the analog shift unit 126 in accordance with the playback channel bit clock signal CLKr; a differential amplifier 128 for differentially amplifying the output of the analog shift unit 127 which output is applied to an uninverted input thereof and the output of the analog shift unit 126 which output is applied to an inverted input thereof; a differential amplifier 129 for differentially amplifying the output of the analog shift unit 127 which output is applied to an inverted input thereof and the output of the analog shift unit 126 which output is applied to an uninverted input thereof; a sampler 131 for sampling the output of the differential amplifier 129 in accordance with the negative high frequency pattern detecting signal FSYp−; a differential amplifier 132 for generating a motor control signal Ms by differentially amplifying the output of the sampler 130 or the sampler 131 which output is applied to an uninverted input thereof and the standard signal Smin applied to an inverted input thereof.

The analog shift units 126, 127 are composed of a different number of analog shifters AS from each other.

Here, a high frequency bit array pattern is composed of a positive high frequency pattern and a negative high frequency pattern. In an EFM modulating method, the positive high frequency pattern is incorporated in "011100011", and the negative high frequency pattern is in "10001110".

The analog shift unit 126 analog-shifts the high frequency generating signal RF2 to a playback channel bit clock signal CLKr which period is obtained by adding "1" to a minimal number Nmin of identical serial bits in a channel bit row and being divided by 2{(Nmin+1)/2}, and the analog shift unit 127 shifts the output of the analog shift unit 126 to a minimal number Nmin of the playback channel bit clock signal CLKr. Here, "1" is added to a minimal number Nmin of identical serial bits in a channel bit row in order to obtain a larger natural number.

The operation of the thusly composed record motor control signal detector 113 will be described, referring to FIGS. 10A–10F wherein FIG. 10A denotes a timing wave diagram of the playback channel bit signal CHBr and FIG. 10D denotes a timing diagram of the radio frequency generating signal RF2.

The record motor control signal detector 113 as described above detects the magnitude Vs of a high frequency generating signal, that is, a playback signal of a minimal pit recorded in the disc, and compares the detected signal with a standard playback signal Smin which is preset, so that a rotation speed of the motor can be judged and a motor control signal can be obtained.

The channel bit pattern detector 125 detects the positive high frequency pattern formed of "01110001" and the negative high frequency pattern formed of "100011101" in a high frequency bit row pattern of the playback channel bit signal CHBr as in FIG. 10A, that is, in an EFM modulating method, and outputs a positive high frequency pattern detecting signal FSYp+ as in FIG. 10C and a negative high frequency pattern detecting signal FSYp− as in FIG. 10B, in accordance with the playback channel bit clock signal CLKr output from the channel bit signal processor 109.

The analog shift unit 126 delays a radio frequency generating signal RF2 as in FIG. 10D to a period (Nmin+1)/2 of the playback channel bit clock signal CLKr, and the analog shift unit 127 shifts the output of the analog shift unit 127 so as to have a period Nmin of the playback channel bit clock signal CLKr in accordance with the playback channel bit clock signal CLKr. Here, Nmin denoting a minimal number of identical serial bits in a channel bit row has a value 3.

The analog shift unit 126 in the EFM modulating method delays a radio frequency generating signal RF2 in two periods of the channel bit clock signal CLKr, and the analog shift unit 127 analog-shifts the output of the analog shifter unit 126 in three periods of the playback channel bit clock signal CLKr. In FIG. 10E, "a" denotes an output of the analog shifter (AS) 126, and "b" denotes an output of the analog shift unit 127.

The differential amplifiers 128, 129 differentially amplify the output of the analog shift units 126, 127 respectively and output differential signals having different polarities. The sampler 130 samples the output of the differential amplifier 128 in accordance with the positive high frequency pattern detecting signal FSYp+, and the sampler 131 samples the output of the differential amplifier 129 in accordance with the negative high frequency pattern detecting signal FSYp−.

The signals sampled in the samplers 130, 131 are detected in the same magnitude as the positive and negative bit pattern polarities, that is, in a magnitude of a high frequency generating signal, and applied to the uninverted input to the differential amplifier 132 which differentially amplifies a standard signal Smin applied to an inverted input thereto to thereby output a record motor control signal Ms as in FIG. 10F.

Figure 11:
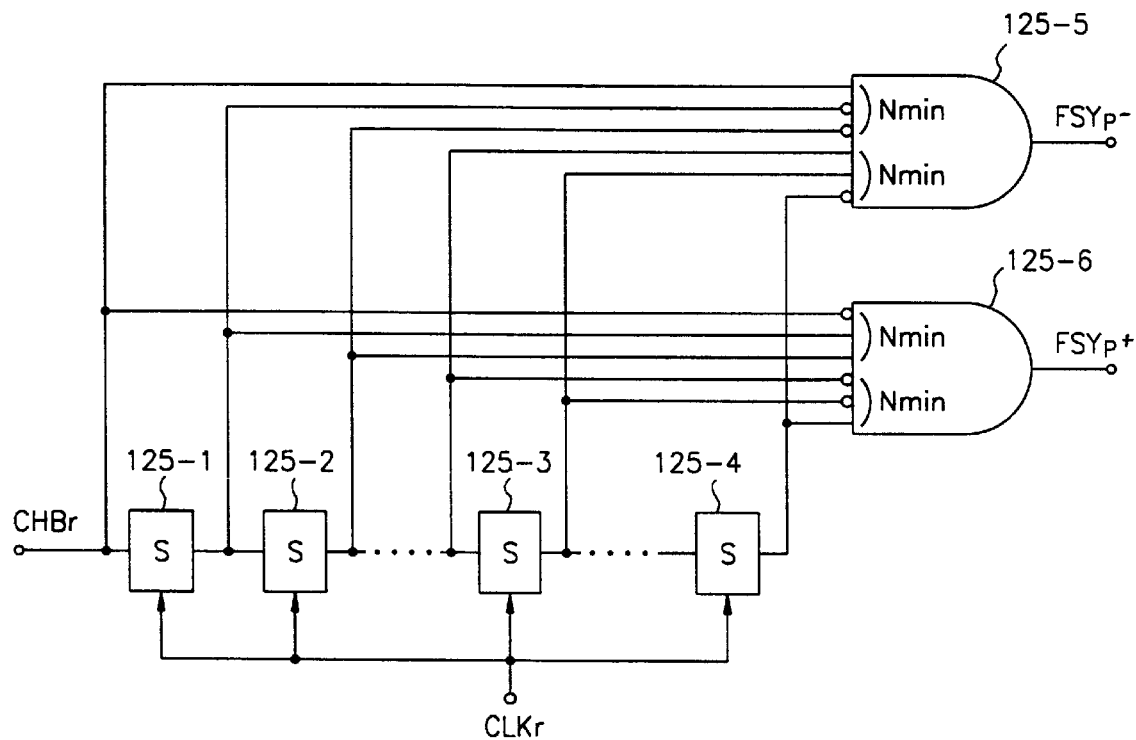
FIG. 11 is a block diagram of a channel bit pattern detector in FIG. 9.

As shown in FIG. 11, the channel bit pattern detector 125 includes: an AND gate 125-5 for generating the positive high frequency pattern detecting signal FSYp+ by ANDing a plurality of shift resisters 125-1 . . . 125-4 each serially connected thereto so as to shift the playback channel bit signal CHBr, the playback channel bit signal CHBr and the shift resisters 125-1 . . . 125-4; and an AND gate 125-6 for generating the negative high frequency pattern detecting signal FSYP+ by ANDing the playback channel bit signal CHBr and the output of the shift resisters 125-1 . . . 125-4, in accordance with the playback channel bit clock signal CLKr output from the channel bit signal processor 109.

Figure 12:
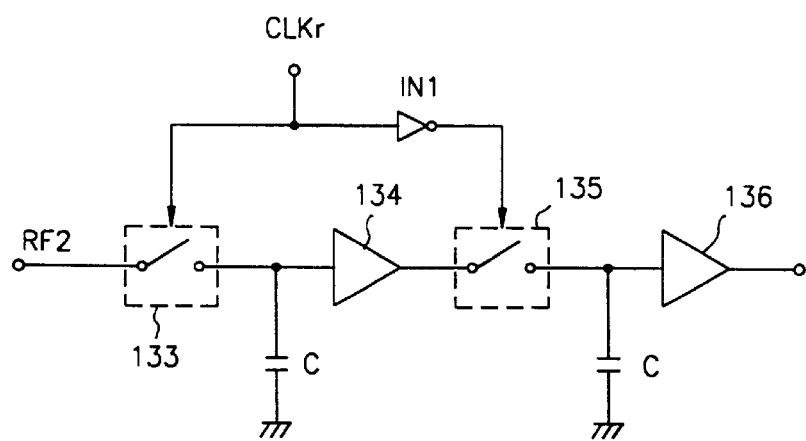
FIG. 12 is a block diagram of an analog shifter in FIG. 9.

As shown in FIG. 12, the analog shifter AS of the analog shift units 126, 127 includes: a switch 133 for generating a radio frequency generating signal RF2; an amplifier 134 for amplifying the output of the switch 133; a switch 135 the output of the amplifier 134 in accordance with the inverted playback channel bit clock signal CLKr; and an amplifier 136 for amplifying the output of the switch 135, in accordance with the playback channel bit clock signal CLKr output from the channel bit signal processor 109.

The shift transistors 125-1 . . . 125-4 shifts the playback channel bit signal CHBr by a bit to the right in the channel bit row in accordance with the period of the playback channel bit clock signal CLKr output from the channel bit signal processor 109.

The AND gate 125-5 compares a number 2Nmin+2 of channel bits serially applied thereto with a bit array pattern, that is, the negative high frequency pattern "10001110", and "1" is output as the negative high frequency pattern FSYp– if the compared values are identical, and "0" is output if different. The AND gate 125-6 compares a number 2Nmin +2 of channel bits serially applied thereto with the positive high frequency pattern "01110001", and "1" is output as the positive high frequency pattern FSYp+ if the compared values are identical, and "0" is output if different.

The analog shifter AS delays the radio frequency generating signal RF2 by a clock signal, in accordance with the playback channel bit clock signal CLKr output from the channel bit signal processor 109.

Figure 13:
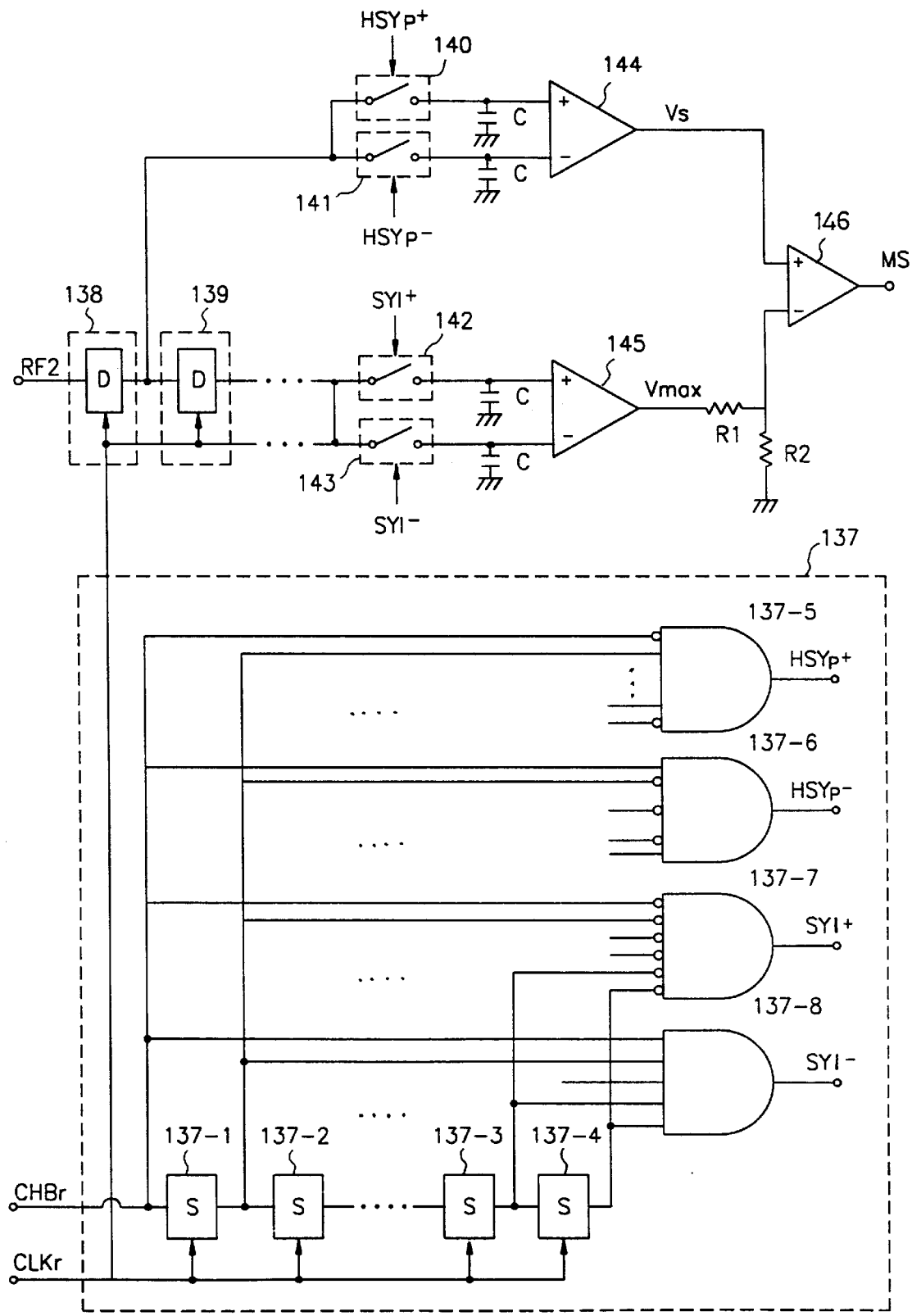
FIG. 13 is a block diagram showing a second embodiment of a record motor control signal detector in FIG. 6.

As shown in FIG. 13, the second embodiment of the record motor control signal detector 113 of FIG. 6 includes: a channel bit pattern detector 137 for detecting a half cycle bit array pattern of the high frequency signal from the playback channel bit signal CHBr, generating a positive half cycle high frequency pattern detecting signal HSYp+ and a negative half cycle high frequency pattern detecting signal HSYp–, detecting a bit array pattern of a low frequency signal from the playback channel bit signal CHBr, and generating a positive low frequency pattern detecting signal HY1+ and a negative low frequency pattern detecting signal HY1–, in accordance with the playback channel bit clock signal CLKr output from the channel bit signal processor 109; a pair of delay units 138, 139 for sequentially delaying the radio frequency generating signal RF2 output from the optical pickup in accordance with the playback channel bit clock signal CLKr; a pair of samplers 140, 141 for respectively sampling the output of the delay unit 138 to a positive half cycle high frequency pattern detecting signal HYSp+ and a negative half cycle high frequency pattern detecting signal HYSp–; a pair of samplers 142, 143 for respectively sampling the output of the delay unit 139 to a positive half cycle low frequency pattern detecting signal HY1+ and a negative half cycle low frequency pattern detecting signal HY1–; a differential amplifier 144 for differentially amplifying the output of the samplers 140, 141; a differential amplifier 145 for differentially amplifying the output of the samplers 142, 143; and a differential amplifier 146 for differentially amplifying the output of the samplers 144, 145.

The channel bit pattern detector 137 includes: a plurality of shift resisters 137-1 . . . 137-4 connected serially to each other to thereby shift the playback channel bit signal CHBr; an AND gate 137-5 for ANDing the playback channel bit signal CHBr and the output of the shift resisters 137-1 . . . 137-4 to thereby output a positive half cycle high frequency pattern detecting signal HSYp+; an AND gate 137-6 for ANDing the playback channel bit signal CHBr and the output of the shift resisters 137-1 . . . 137-4 to thereby output a negative half cycle high frequency pattern detecting signal HSYp–; an AND gate 137-7 for ANDing the playback channel bit signal CHBr and the output of the shift resisters 137-1 . . . 137-4 to thereby output a positive half cycle low frequency pattern detecting signal HS1+; and an AND gate 137-8 for ANDing the playback channel bit signal CHBr and the output of the shift resisters 137-1 . . . 137-4 to thereby output a negative half cycle low frequency pattern detecting signal HS1–.

The high frequency half cycle bit array pattern in the EFM method is composed of a positive half cycle high frequency pattern having "01110" and a negative half cycle high frequency pattern having "10001", and the low frequency signal bit array pattern is composed of a positive low frequency bit array pattern having "11111111" and a negative low frequency signal bit array pattern having "00000000".

The delay unit 138 delays the radio frequency generating signal RF2 to correspond to the period of a playback channel bit clock signal CLKr which period is obtained by adding "1" to the number Nmin of identical serial bits in a high frequency bit pattern, and the delay unit 139 delays the radio frequency generating signal RF2 to correspond to the period of a playback channel bit clock signal CLKr which period is obtained by adding "1" to the number Nmin of identical serial bits in a low frequency bit pattern.

The second embodiment of the thusly composed record motor control signal detector 113 will be described with reference to the accompanying drawings.

The channel bit signal CHBr is shifted bit by bit to the right by the shift registers 137-1 . . . 137-4 in a period of the playback channel bit clock signal CLKr output from the channel bit signal processor 109.

If serially applied channel bits which are output from the playback channel bit signal CHBr and the shift registers 137-1, . . . ,137-4 are identical to a preset bit array pattern which is the positive half cycle high frequency pattern "01110", the AND gate 137-5 outputs "1" as the positive half cycle high frequency pattern detecting signal HSYp+, and if not identical the AND gate 137-5 outputs "0".

Also, if serially applied channel bits are identical to a preset bit array pattern which is the negative half cycle high frequency pattern "10001", the AND gate 137-6 outputs "1" as the negative half cycle high frequency pattern detecting signal HSYp–, and if not identical the AND gate 137-5 outputs "0".

Further, if serially applied channel bits are identical to a preset bit array pattern which is the negative half cycle low frequency pattern "11111111", the AND gate 137-7 outputs "1" as the positive half cycle low frequency pattern detecting signal HS1+, and if not identical the AND gate 137-7 outputs "0", and if serially applied channel bits are identical to a preset bit array pattern which is the negative half cycle low frequency pattern "00000000", the AND gate 137-8 outputs "1" as the negative-half cycle-low. frequency pattern detecting signal HS1–, and if not identical the AND gate 137-8 outputs 11011.

The delay unit 138 receives the radio frequency generating signal RF2 and delays the signal RF2 in a period (Nmin+1)/2 of the playback channel bit clock signal CLKr relative to the high frequency signal, and the delay unit 139 receives the output of the delay unit 138 and delays for output the signal RF2 in a period (N+1)/2 of the playback channel bit clock signal CLKr. Here, in the EFM modulating method, the number N of identical serial bits of a low frequency signal bit pattern ranges from 8 to 11.

The pair of samplers 140, 141 each sample/hold the output of the delay unit 138 to a positive half cycle high frequency pattern detecting signal HYSp+ and a negative half cycle high frequency pattern detecting signal HYSp– to thereby detect a level of the playback signal, and the pair of samplers 142, 143 respectively sample/hold the output of the delay unit 139 to a positive half cycle low frequency pattern detecting signal HY1+ and a negative half cycle low frequency pattern detecting signal HY1– to thereby detect a level of the playback signal.

The differential amplifier 144 differentially amplifies the output of the amplifier 140 applied to an inverted input thereto and the output of the amplifier 141 applied to an uninverted input thereto to thereby output the magnitude Vs of the high frequency generating signal, and the differential amplifier 145 differentially amplifying the output of the sampler 142 applied to an uninverted input thereto and the output of the amplifier 143 applied to an inverted input thereto to thereby output the magnitude Vmax of the low frequency generating signal. At this time, resistances R1, R2 partially press the output of the differential amplifier 145 according to the resistance ratio.

The differential amplifier 146 differentially amplifies the magnitude Vs of the high frequency generating signal applied to the uninverted input thereto and the magnitude Vmax of the low frequency generating signal applied to the inverted input thereto, to thereby output a record motor control signal Ms. Here, the ratio Vs/Vmax (=R2/(R1+R2)) of the magnitude Vs of the high frequency generating signal to the magnitude Vmax of the low frequency generating signal is stably maintained.

Meanwhile, the record channel bit signal CHBr recorded by the laser beam LB1 is delayed for a certain time dT (=dL/V) and output in the form of a playback channel bit signal CHBr after the radio frequency generating signal RF2 is processed by the laser beam LB2. As a result, the time delay of dT occurs between the record channel bit signal CBHr and the playback channel bit signal CHBr, so that if a normal scanning speed or a linear speed Vn is maintained for the disc 101 the time delay between the two signals become dTn and if the time delay is controlled to be dTn the spinning rate of the disc 101 can be constantly controlled.

Figure 14:
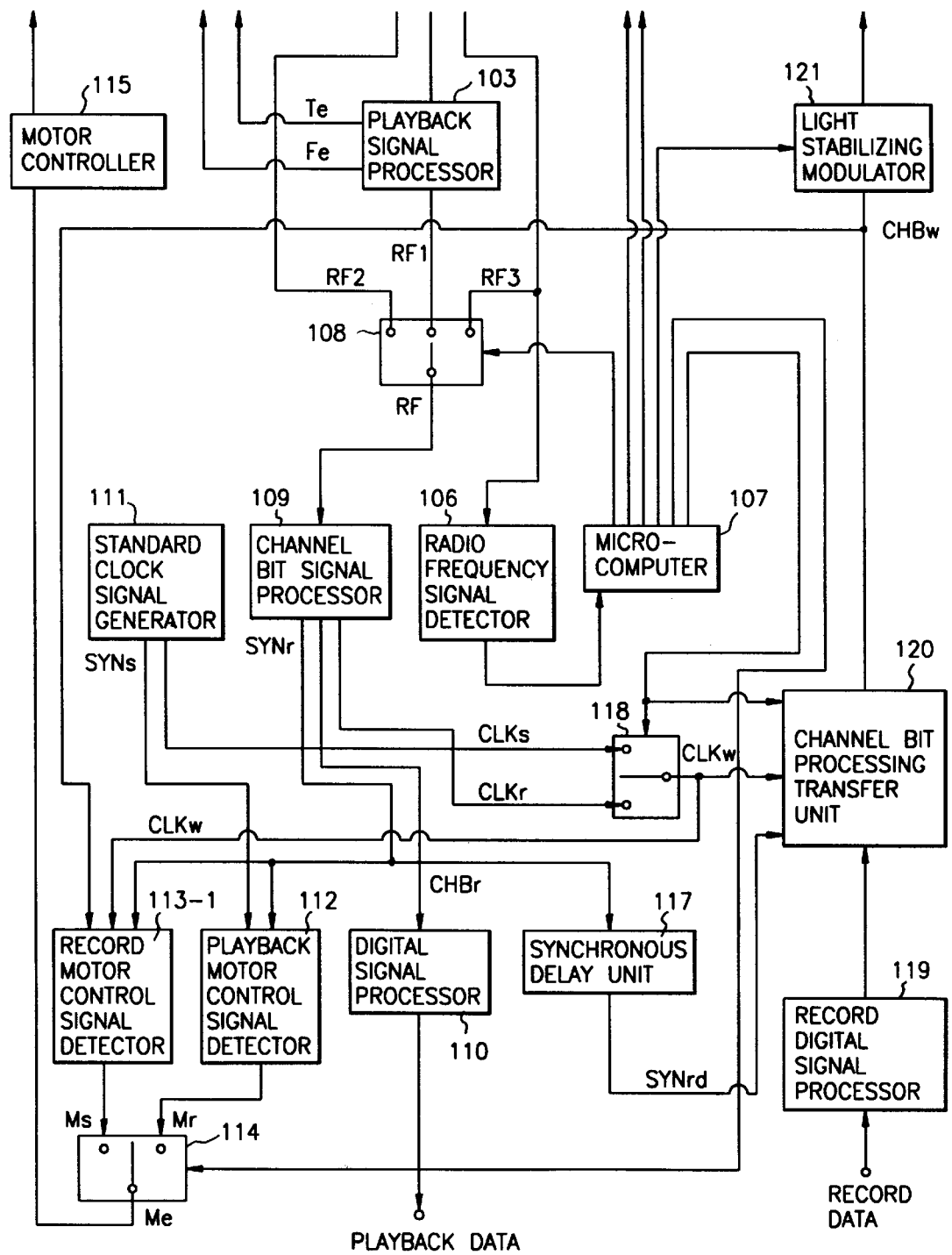
FIG. 14 is a block diagram showing a second embodiment of an optical disc recording/playing apparatus according to the present invention.

FIG. 14 showing the second embodiment of the optical disc recording/playing apparatus according to the present invention is identical to the first embodiment of FIG. 6 with the exception of the record motor control signal detector 113-1.

The record motor control signal detector 113-1 receives a record channel bit signal CHBw output from the channel bit processing transfer unit 120, a playback channel bit synchronous signal SYNr output from the channel bit signal processor 109 and a record clock signal CLKw output from the record clock selector 118, and outputs a record motor control signal Ms.

Figure 15:
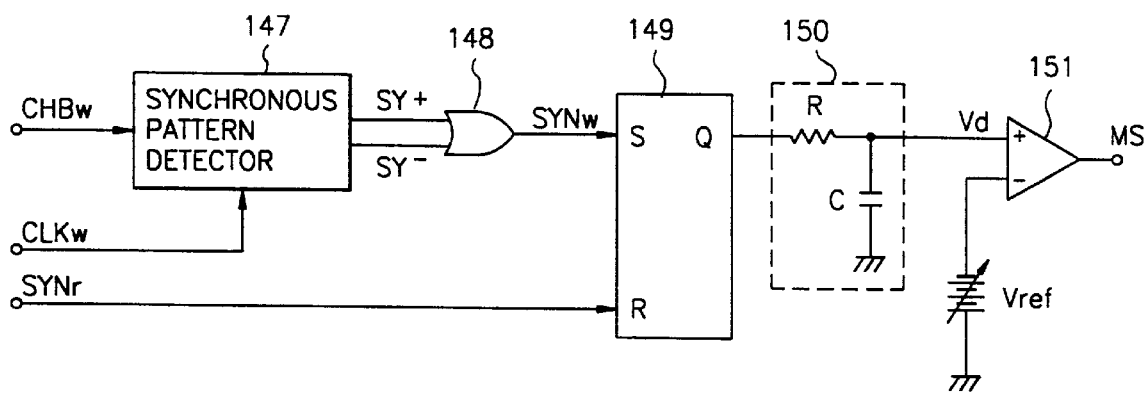
FIG. 15 is a block diagram of a record motor control signal detector in FIG. 14.

As shown in FIG. 15, the record motor control signal detector 113-1 includes: a synchronous pattern detector 147 for detecting a synchronous pattern by receiving the record channel bit signal CHBw output from the channel bit processing transfer unit 120 and generating a positive synchronous pattern detecting signal SY+ and a negative synchronous pattern detecting signal SY−, in accordance with the record clock signal CHBw output from the record clock selector 118; an OR gate 148 for ORing the positive synchronous pattern detecting signal SY+ and the negative synchronous pattern detecting signal SY− each output from the synchronous pattern detector 147 and generating a record synchronous signal SYNw; an RS flip-flop 149 for receiving the output from the OR gate 148 through a set input S thereof and the playback channel bit synchronous signal SYNr through a reset input R thereof; an integrator 150 for integrating the output from the RS flip-flop 149; and a differential amplifier 151 for differentially amplifying the output of the integrator 150 applied to an uninverted input thereof and a supply voltage Vref applied to an inverted input thereof and generating an motor control signal Ms.

Figure 16:
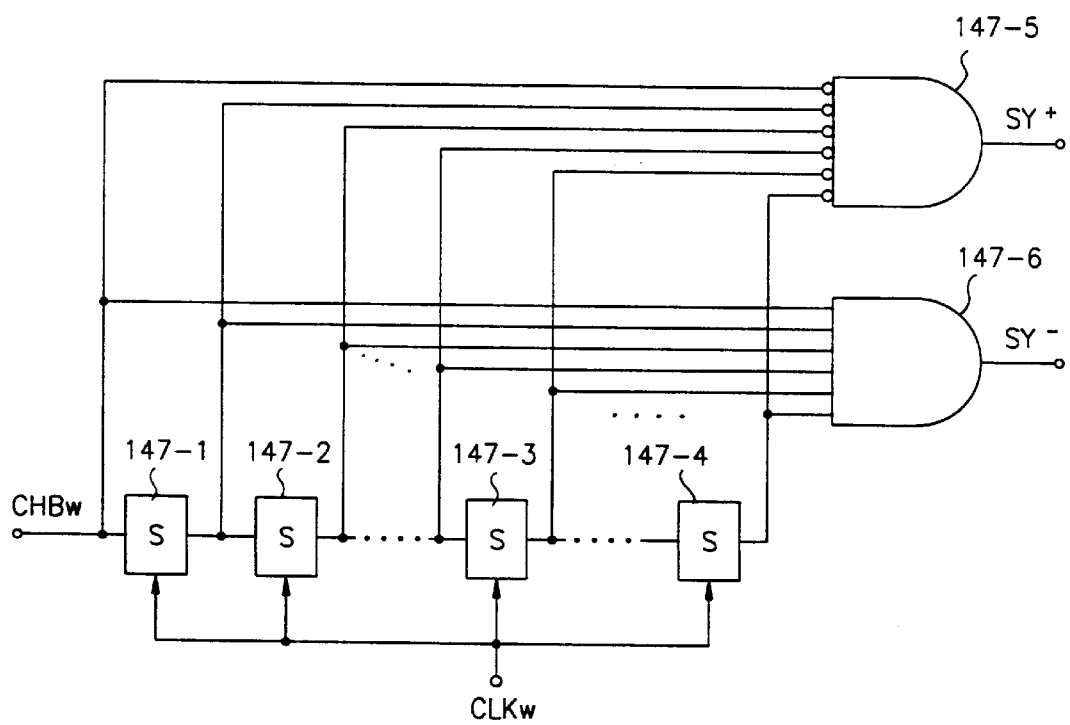
FIG. 16 is a block diagram of a synchronized pattern detector in FIG. 15.

As shown in FIG. 16, the synchronous pattern detector 147 includes: a plurality of shift resisters 147-1, . . . ,147-4 connected serially to each other to thereby shift the playback channel bit signal CHBr; an AND gate 147-5 for ANDing the playback channel bit signal CHBr and the output of the shift resisters 147-1, . . . ,147-4 to thereby output a positive synchronous pattern detecting signal SY+; and an AND gate 1476 for ANDing the playback channel bit signal CHBr and the output of the shift resisters 147-1, . . . ,147-4 to thereby output a negative synchronous pattern detecting signal SY−.

The operation of the thusly composed record motor control signal detector 113-1 will be described.

The synchronous pattern detector 147 of the record motor control signal detector 113-1, in accordance with the record clock signal CLKw output from the record clock selector 118, detects from the record channel bit signal CHBw output from the channel bit processing transfer unit 120 a positive synchronous pattern formed of "00001111" according to the EFM method and a negative synchronous pattern formed of "11110000" to thereby output the positive synchronous pattern detecting signal SY+ and the negative synchronous pattern detecting signal SY−.

In accordance with the record clock CLKw, the plurality of shift registers 147-1, . . . ,147-4 shift by one bit the array of the channel-bit signals CHBw to the right. If the serially applied channel bits are identical to the positive synchronous pattern "00001111" which is previously set, the AND gate 147-5 outputs "1" serving as a positive synchronous pattern detecting signal SY+, and if not identical the gate 147-5 outputs "0".

Also, if the serially applied channel bits are identical to the negative synchronous pattern "11110000" which is previously set, the AND gate 147-6 outputs "1" serving as a negative synchronous pattern detecting signal SY−, and if not identical the gate 147-6 outputs "0".

Then, the positive synchronous pattern detecting signal SY+ and the negative synchronous pattern detecting signal SY− each output from the AND gates 147-5, 147-6 are ORed in the OR gate 148 which in turn outputs a record synchronous signal SYNw to the RS flip-flop 149 which is reset in accordance with the playback channel bit synchronous signal SYNr output from the channel bit signal processor 109.

Therefore, as the RS flip-flop 149 is set/reset, the output Q of the flip-flop 149 is integrated in the integrator 150 and output therefrom in the form of a signal voltage Vd proportionate to a delay time, and the signal voltage Vd applied to an uninverted input to the differential amplifier 151 is differentially amplified with the standard voltage Vref applied to an inverted input thereto to thereby output a motor control signal Ms.

When there occurs a time delay dT between the record channel bit signal CHBw and the playback channel bit signal CHBr, the identical time delay dT occurs between the record channel bit synchronous signal SYNw detected from each channel bit signal and the playback channel bit synchronous signal SYNr.

So, the RS flip-flop 149 set/reset in accordance with the record channel bit signal synchronous signal SYNw and the record channel bit synchronous signa SYNr generates a pulse signal, which passes through the integrator 150 to be thereby incorporated in the signal voltage Vd which is proportionate to the delay time. At this time, when maintaining a normal scanning rate, that is, a linear scanning velocity of the disc 101, the standard voltage Vref denotes a detection voltage serving as a delay time in the record channel bit synchronous signal SYNw and the playback channel bit synchronous signal SYNr.

Figure 17:
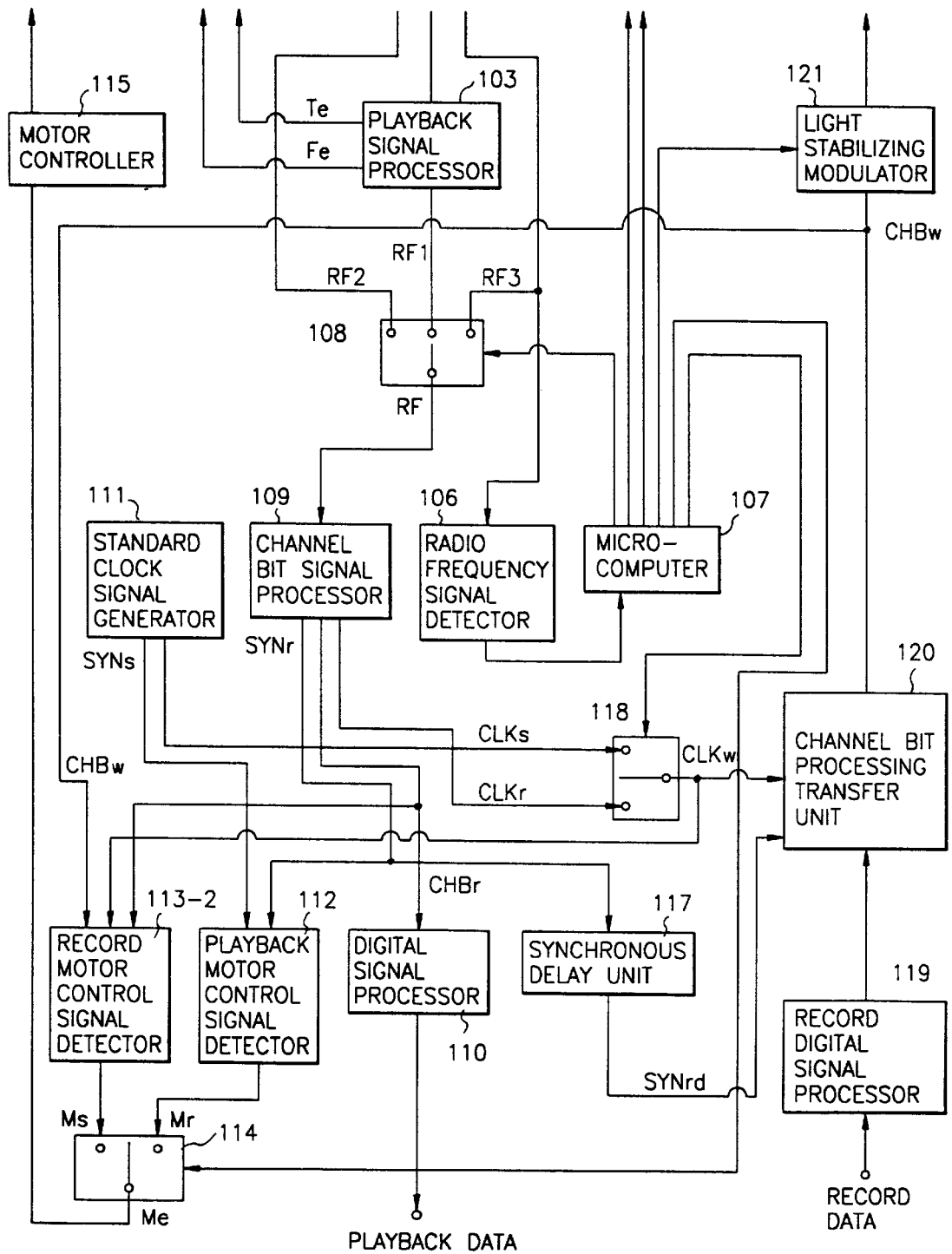
FIG. 17 is a block diagram showing a third embodiment of an optical disc recording/playing apparatus according to the present invention.

FIG. 17 showing the third embodiment of the optical disc recording/playing apparatus according to the present invention remains identical to FIG. 6 with the exception of a record motor control signal detector 113-2 which outputs a record motor control signal Ms so as to control the motor by receiving the record channel bit signal CHBw output from the channel bit processing transfer unit 120, the playback channel bit signal CHBr output from the channel bit signal processor 109 and the record clock signal CLKw output from the record clock selector 118.

Figure 18:
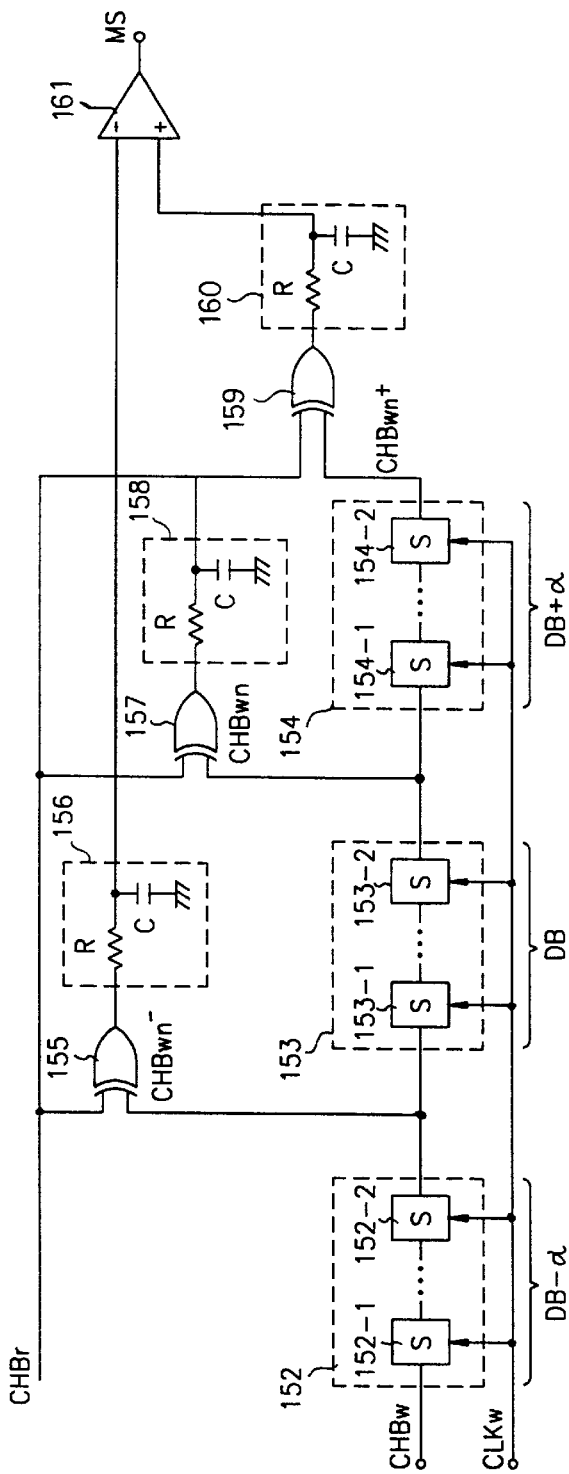
FIG. 18 is a block diagram of a record motor control signal detector in FIG. 17.

As shown in FIG. 18, the record motor control signal detector 113-2 includes: shift register units 152, 153, 154 each for delaying for a certain time the record channel bit signal CHBw output from the channel bit processing transfer unit 120, in accordance with the record clock CLKw output from the record clock selector 118; an exclusive OR gate 155 for exclusively ORing the output from the shift register 152 and the playback channel bit signal CHBr output from the channel bit signal bit processor 109; an integrator 156 for integrating the output from the exclusive OR gate 155 and generating a signal voltage proportionate to the correlation between a pair of signals which are obtained by dTn− a time-delaying a playback signal and a record signal; an exclusive OR gate 157 for exclusively ORing the output from the shift register 153 and the playback channel bit signal CHBr; an integrator 158 for integrating the output from the exclusive OR gate 157 and generating a signal voltage proportionate to the correlation between a pair of signals which are obtained by dTn time-delaying a playback signal and a record signal; an exclusive OR gate 159 for exclusively ORing the output from the shift register 154 and the playback channel bit signal CHBr; an integrator 160 for integrating the output from the exclusive OR gate 159 and generating a signal voltage proportionate to the correlation between a pair of signals which are obtained by dTn+ a time-delaying a playback signal and a record signal; and a differential amplifier 160 for differentially amplifying the output from the integrator 156 which is applied to an inverted input thereto and the output from the integrator 160 which is applied to an uninverted input thereto to thereby generate a motor control signal Ms.

Each of the shift register units 152, 153, 153 are sequentially composed of a plurality of shift registers 152-1, 152-2; 153-1, 153-2; 154-1, 154-2.

The operation of the record motor control signal detector 113-2 will now be described.

First, the plurality of shift registers provided in the shift register units 152, 153, 154 delay the record channel bit signal CHBw to correspond to a period DBn having a certain bit, in accordance with the record clock signal CLKw.

That is, when the record channel bit signal CHBwn which is delayed-output from the shift register unit 153 is centered, the shift register units 152, 154 provided in the rear and front of the unit 153 generates a delayed record channel bit signal CHBwn−, CHBwn+, respectively.

Also, the record channel bit signal CHwn− output from the shift register unit 152 denotes a signal delayed in a DBn−DB period for a delay time dTn− a serving as a clock signal period of the channel bit signal. The record channel bit signal CHBwn output from the shift register unit 153 denotes a signal delayed in a DBn period for a delay time dTn serving as a clock signal period of the channel bit signal. The record channel bit signal CHBwn+ output from the shift register unit 154 denotes a signal delayed in a DBn+DB period for a delay time dTn+ a serving as a clock signal period of the channel bit signal.

Figure 19:
FIGS. 19A–19C are graphs showing signal voltages proportionate to a correlation between a record channel bit signal and a playing channel bit signal.

As a result, the record channel bit signal CHBwn− output from the shift register unit 152 is exclusively ORed with the playback channel bit signal CHBr in the exclusive OR gate 155, and integrated in the integrator 156 to thereby output a signal voltage which is delayed for a dTn− a time which is proportionate to the correlation between the record channel bit signal CHBwn− and the playback channel bit signal CHBr as shown in FIG. 19A.

The record channel bit signal CHBwn+ output from the shift register unit 154 is exclusively ORed with the playback channel bit signal CHBr in the exclusive OR gate 159, and integrated in the integrator 160 to thereby output a signal voltage which is delayed for a dTn+ a time which is proportionate to the correlation between the record channel bit signal CHBwn+ and the playback channel bit signal CHBr as shown in FIG. 19C.

Also, the record channel bit signal CHBwn output from the shift register unit 153 passes through the exclusive OR gate 159 and the integrator 160 and is output in the form of a signal voltage as shown in FIG. 19B.

Therefore, the signal voltage output from the integrator 156, 158, 160 have correlations Rxn−, Rxn, Rxn+ as shown in FIGS. 19A–19C.

Here, when the motor 116 maintains a normal recording velocity Vn the pair of channel bit signals CHBwn, CHBr has a maximum value of correlation, and when the record velocity deviates from the normal velocity Vn to thereby cause a velocity gap, the correlation will decrease according to the velocity gap and the value of the correlation gradually decreases.

The correlation values Rxn−, Rxn+ show a variation according to a time delay, and the correlation values Rxn−, Rxn+ output from the integrator 156, 160 are differentially amplified in the differential amplifier 161 to thereby cause to generate the record motor control signal Ms.

Figure 20:
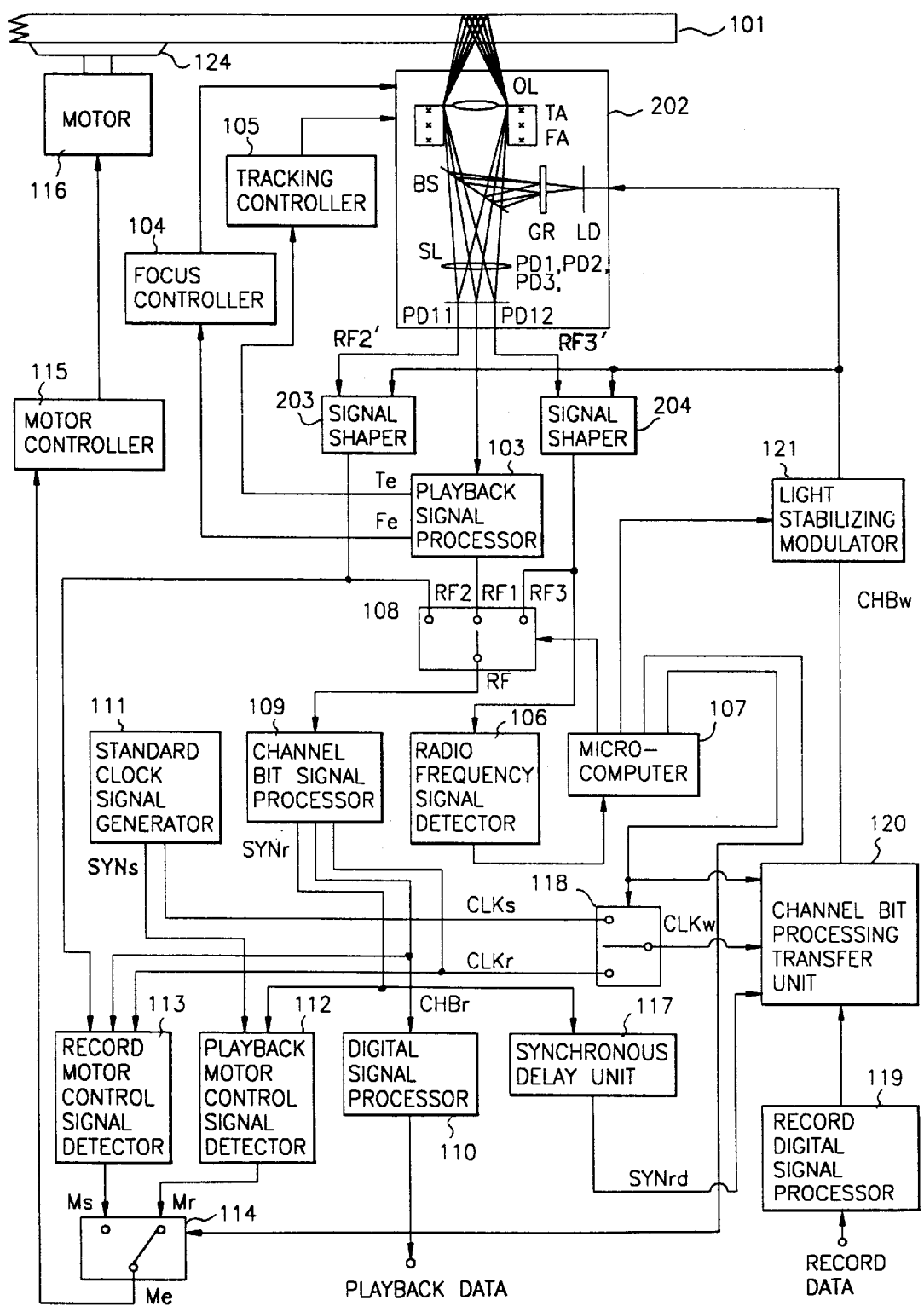
FIG. 20 is a block diagram showing a fourth embodiment of an optical disc recording/playing apparatus according to the present invention.

FIG. 20 shows the fourth embodiment of the optical disc recording/playing apparatus according to the present invention, wherein the optical stabilizers 122, 123 are excluded from FIG. 6 showing the first embodiment of the optical disc recording/playing apparatus according to the present invention, and an optical pick-up 202 and signal shapers 203, 204 are differently provided.

The optical pick-up 202 includes: a laser diode LD for generating a laser beam by the control of the light stabilizing modulator 121; a grating GR for branching the laser beam output from the laser diode LD into laser beams LB1, LB2, LB3; a beam splitter BS for reflecting the beams LB1, LB2, LB3 generated from the grating GR; an object lens OL for converging the three laser beams reflected from the beam splitter BS onto a portion of a signal track of the disc; a focus activator FA and a tracking activator TA for moving the object lens OL in the direction of tracking and/or focusing so that the object lens OL can accurately converge the three laser beams onto a signal track of the disc; a sensor lens SL for converging the beams which have passed through the beam splitter BS after being reflected from the disc; and photo detectors PD1, PD2, PD3.

The signa shapers 203, 204 shape radio frequency generating signals RF2', RF3' reproduced by the beams LB2, LB3 of the optical pick-up 202 in accordance with a light amount control signal output from the light stabilizing modulator 121 to thereby output the radio frequency generating signal RF2, RF3 by removing a signal generated by a light amount modulation.

The operation of the fourth embodiment of the optical disc recording/playing apparatus according to the present invention will be described by selecting the difference from the first embodiment thereof.

Different from the conventional optical disk playing-back apparatus which employs three laser beams to detect a tracking control signal, the present invention employing a recording disc having a land and groove structure can easily adapt a push-pull method in accordance with a single beam.

The grating GR grates the light emitted from the laser diode LD to thereby multiply to the three beams LB1, LB2, LB3.

Figure 21A:
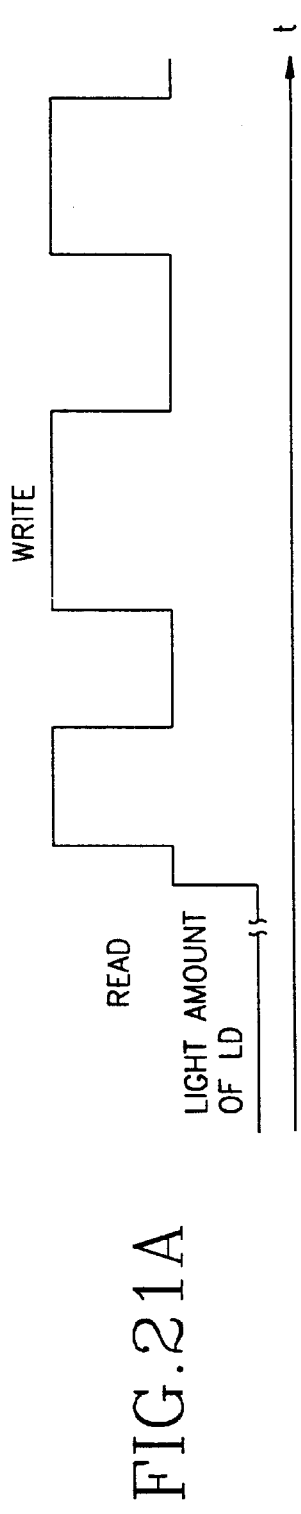
FIGS. 21A–21C are timing diagrams for each portion in FIG. 20.
Figure 21B:
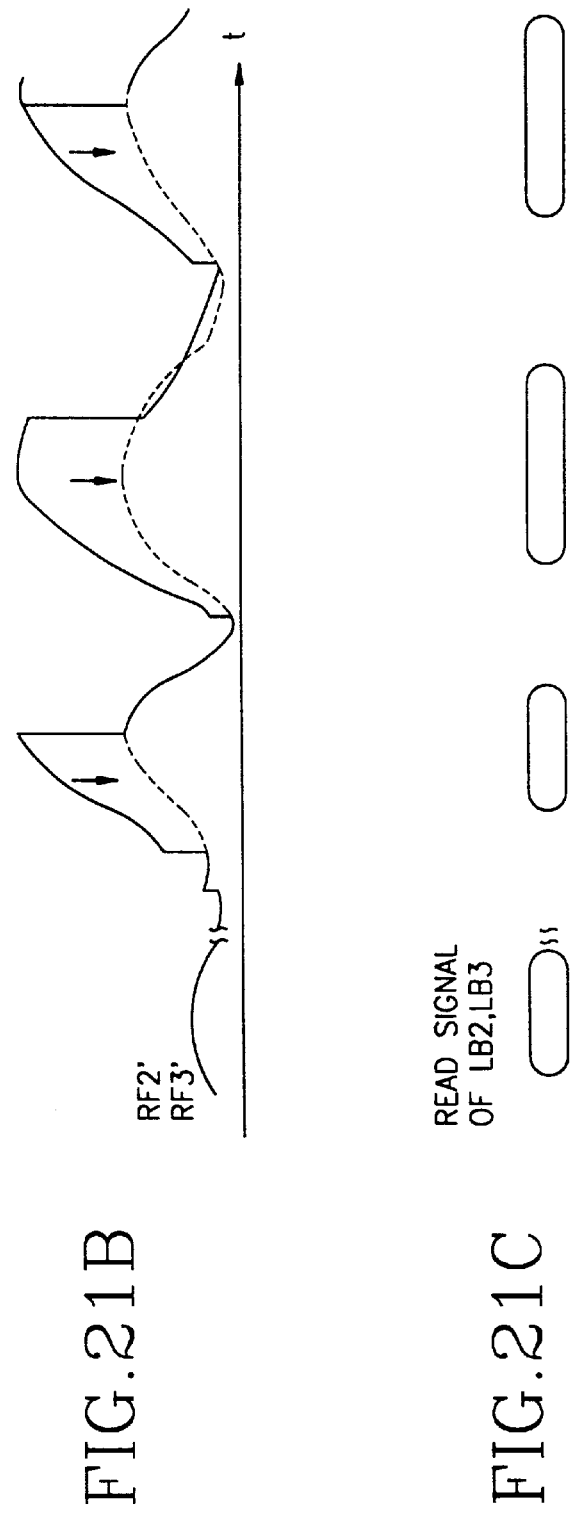
Figure 21C:

Here, when the luminous amount of the laser diode LD is modulated to modulate the light amount of the record laser beam LB1, the light amount of the playback laser beams LB2, LB3 are also concurrently varied, and because the radio frequency signals RF2', RF3' in accordance with the playback beams LB2, LB3 are mixed with a record signal and a playback signal as shown in FIG. 21B, the signal generated during modulation of light amount must be removed.

Therefore, from the radio frequency generating signals RF2', RF3' applied to the signal shapers 203, 204 a signal generated by a light modulation serving as a record signal is removed to thereby cause the signal shapers 203, 204 to output the radio frequency generating signals RF2, RF3.

Figure 22:
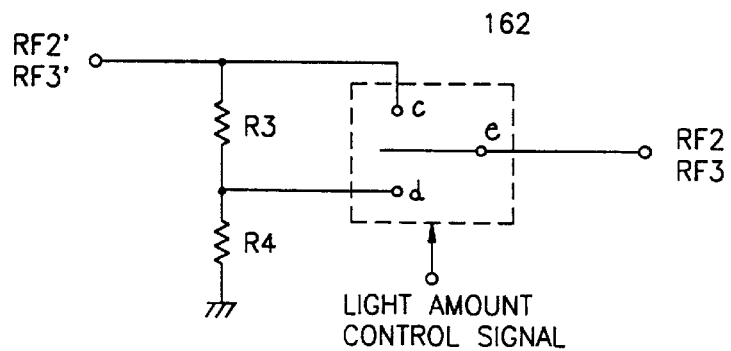
FIG. 22 is a block diagram showing a first embodiment of a signal shaper in FIG. 20.

As shown in FIG. 22, the first embodiment of the signal shapers 203, 204 includes: resistances R3, R4 connected parallel to an input to the radio frequency signals RF2', RF3'; and a switch 162 to a fixed terminal c of which a control signal is connected and to another fixed terminal d of which a node between the resistances R3, R4 is connected, to thereby output the radio frequency generating signals RF2, RF3 in accordance with a control signal output from the light stabilizing modulator 121. Here, the control signal applied to the switch 162 denotes a light amount signal serving as a power signal for turning on the laser diode LD of the optical pick-up 202.

As the light amount of the playback laser beams LB2, LB3 is variable, the radio frequency generating signals RF2', RF3' are generated in the form of a gain inversely proportionate to the light amount of the playback laser beams LB2, LB3. Also, when the ratio frequency generating signals RF2', RF3' are amplified to be inversely proportionate to the light amount of the laser diode LD, the radio frequency generating signals RF2, RF3 having a constant gain will be obtained.

That is, if a radio frequency signal amplifier is provided which can continuously change an amplified gain, the radio frequency generating signals RF2, RF3 having a constant gain is obtained by controlling the gain of the radio frequency generating signals RF2', RF3' in accordance with a control signal, that is, a light amount signal of the laser diode LD. However, when the variation of the light amount is not continuous, and instead the recording occurs in the form of a phase variation for recording/erasing of data by changing the recording light in two steps as shown in FIG. 21A, the radio frequency generating signals RF2, RF3 having constant gain can be obtained by the switch 162 as shown in FIG. 22.

Assuming that a recording amount in modulating a recording light denotes LPrec and an erasing light amount denotes LPera to perform a two-step light modulation, there is obtained an expression as follows.

LPera/LPrec=R4/(R3+R4)

When the resistances R3, R4 are set and the light is recorded the record radio frequency generating signal RFrec is selected, and when the switch 162 is controlled so that when the light is erased the erasing radio frequency generating signal RFera is selected, the radio frequency generating signal RF having a constant gain is obtained.

Figure 23:
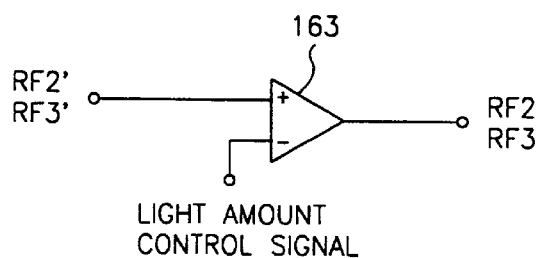
FIG. 23 is a block diagram showing a second embodiment of a signal shaper in FIG. 20.

As shown in FIG. 23, the second. embodiment of the signal shapers 203, 204 includes a differential amplifier 163 for receiving to an uninverted input thereof the radio frequency generating signal RF2', RF3' reproduced by the laser beams LB2, LB3, and to an inverted input thereof a light amount signal output from the light stabilizing modulator 121 to thereby output a high frequency generating signals RF2, RF3.

The differential amplifier 163 differentially amplifies the radio frequency generating signals RF2', RF3' and the light amount signal applied to an inverted input thereof to thereby output a radio frequency generating signal having the same zero level signal so that an accurate channel bit can be obtained by a zero-crossing.

Also, the channel bit signal processor 109 includes a zero crosser for preventing the radio frequency generating signal RF selected from the playback signal selector 108 from being mixed with the record channel bit signal CHBw.

Figure 24:
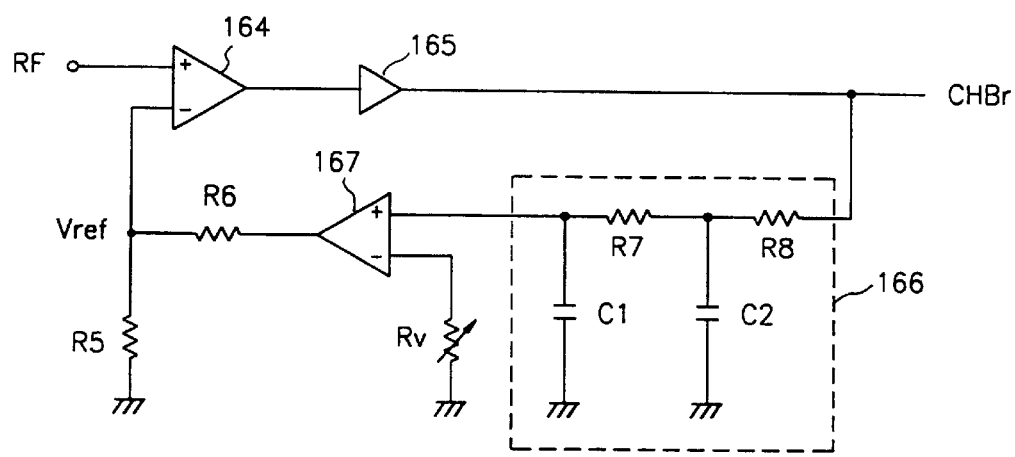
FIG. 24 is a block diagram of a zero-crossing device provided in the channel bit signal processor in FIG. 20.

As shown in FIG. 24, the zero crosser includes: a comparator 164 for comparing the radio frequency generating signal RF applied to an uninverted input thereof with the standard voltage Vref fed back to an inverted input thereof; a buffer 165 for receiving the output of the comparator 164 and generating a playback channel bit signal CHBr; a low pass filter 166 connected parallel to an output of the buffer 165 to thereby filter the output of the buffer 165; and a differential amplifier 167 for zero-crossing the output of the low pass filter 166 applied to an inverted input thereof and generating a standard voltage Vref through the resistance R6 to an inverted input of the comparator 164.

Here, the resistance R6 is provided between the inverted input of the comparator 164 and a ground voltage and connected parallel to a resistance R5.

The low pass filter 166 includes: resistances R7, R8 serially connected to each other; a capacitor C1 connected parallel between an uninvested input of the differential amplifier 167 and the resistance R7; and a capacitor C2 connected parallel to a node between the resistance R7 and R8.

The operation of the thusly composed zero crosser will be described.

First, the radio frequency generating signal RF is applied to an uninverted input of the comparator 164 and compared with the standard voltage Vref applied to an inverted input of the comparator 164. The compared signal is buffered in the buffer 165 which in turn generates a square wave serving as a zero-crossed playback channel bit signal CHBr.

The output of the buffer 165 is filtered in the low pass filter 166 and applied to an uninverted input of the differential amplifier 167, which generates the standard voltage Vref for being applied to an inverted input of the comparator 164 in accordance with a zero-crossing signal level set by a variable resistance Rv. At this time, the level ratio of a low and a high signal in the zero-crossed channel bit signals is set to be "1" to thereby compensate for an asymmetry of the disc, and to the standard voltage Vref of the comparator 164 there is added a voltage proportionate to a light amount which has detected a signal to thereby zero-cross the signal.

The optical disc recording/playing apparatus as described above employs a light wave width modulating method, wherein data is recorded by changing the reflection degree of the optical disc to thereby record data, sensing the reflected light amount and detecting a playback signal, thereby recording/playing-back data on the disc.

However, when playing back an optical magnetic disc reads data by detecting a polarizing amount of light reflected after being applied to the magnetic disc. This is because an information signal is recorded in accordance with a magnetic direction of a signal track and the polarizing direction of light which is operated with magnetic is changed in accordance with a magnetic direction.

Therefore, the structure of an optical pick-up must be changed, a magnetic head is required, and the optical pick-up must be formed of a polarizing optical system. Also, in a recording method there are provided a magnetic modulating record method and an optical modulating record method.

Figure 25:
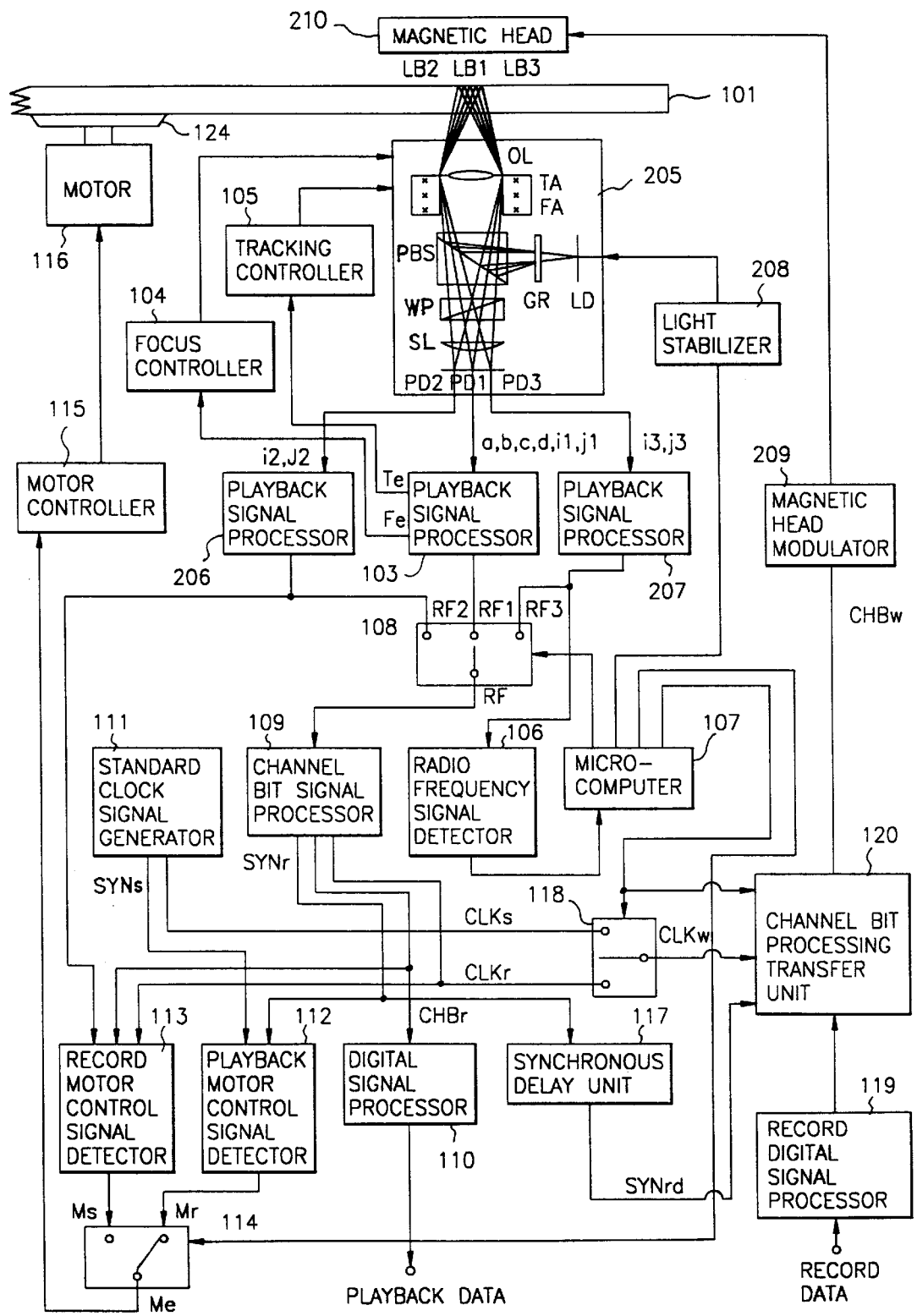
FIG. 25 is a block diagram showing a fifth embodiment of an optical disc recording/playing apparatus according to the present invention.

FIG. 25 shows the fifth embodiment of the optical disc recording/playing apparatus which employs an optical magnetic disc adapting a magnetic modulating record method, wherein the optical pick-up 205 of the fourth embodiment as shown in FIG. 20 is provided differently and instead of the signal shapers 203, 204 there are provided playback signal processors 206, 207 for generating a radio frequency generating signal by processing the signal reproduced by the laser beam LB2.

Also, there is provided a light stabilizer 208 instead of the light stabilizing modulator 121 and a magnetic head modulator 209 for recording in the optical magnetic disc 102 the channel bit signal CHBw output from the channel bit processing transfer unit 120 in accordance with controlling the magnetic direction of the magnetic head 210.

Figure 26:
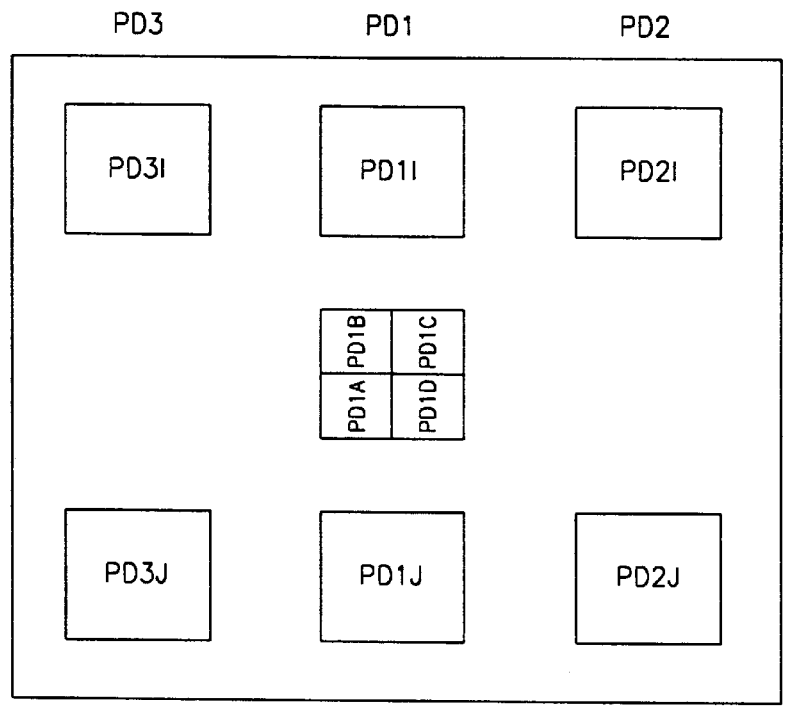
FIG. 26 is a structural view of a photo detector in FIG. 25.

As shown in FIG. 26, the photo detector PD1 has four photo detecting elements PD1A, PD1B, PD1C, PD1D partitioned track-wardly and radially relative to the disc, and above and below the photo detecting elements PD1A, PD1B, PD1C, PD1D there are provided photo detecting elements PD1I, PD1J.

On the right side of each of the photo detectors PD1I, PD1J there are correspondingly provided photo detecting elements PD2I, PD2J, and on the left side of each of the photo detectors PD1I, PD1J there are correspondingly provided photo detecting elements PD3I, PD3J.

The operation of the fifth embodiment of the optical disc recording/playing apparatus according to the present invention is formed similar nearly to the fourth embodiment so that only the different portions will be described.

First, on a signal track of the optical magnetic disc having a land and groove structure there are converged the laser beams LB1, LB2, LB3 each spaced by a certain distance, and the light reflected from the disc record surface is detected in accordance with the three photo detectors PD1, PD2, PD3.

The photo detecting-elements PD1A–PD1D, PD1I, PD1J of the photo detector PD1 detect the amount of the laser beam reflected from the laser beam LB1 to thereby output electrical signals a,b,c,d,i1,j1, and the photo detecting elements PD2I, PD2J of the photo detector PD2 detect the amount of the laser beam reflected from the laser beam LB2 to thereby output electrical signals i2,j2, and also the photo detecting elements PD3I, PD3J of the photo detector PD3 detect the amount of the laser beam reflected from the laser beam LB3 to thereby output electrical signals i3,j3.

The playback signal processor 103 outputs a radio frequency generating signal RF1 by subtracting j1 from i1 (i1–j1), a focus control signal Fe by (a+c)–(b+d), and a tracking control signal Te by (a+b)–(c+d).

The playback signal processor 206 subtracts j2 from i2 (i2–j2) to thereby output a radio frequency generating signal RF2, and the playback signal processor 207 subtracts j3 from i3 (i3–j3) to thereby output a radio frequency generating signal RF3.

Then, in accordance with the control of the microprocessor 107, the playback signal selector 108 selects one of the radio frequency generating signals RF1, RF2, RF3.

When recording data, the light stabilizer 208 controls the laser diode LD with the strength of a record light in accordance with the control of the microprocessor 107 so that the record channel bit signal CHBw output from the channel bit processing transfer unit 120 is modulated in the magnetic head modulator 209 and recorded in the optical magnetic disc 101 through the magnetic head 210. The rest of the operation will be omitted which is identical to that of the fourth embodiment.

The previously described present invention employs the three laser beams LB1, LB2, LB3 which are necessarily essential. That is, when playing-back, the laser beam LB1 is only used. When recording, the pair of laser beams LB1, LB2 are employed if applied to a blank disc, and the pair LB1, LB3 are used if applied to a recorded disc.

Figure 27:
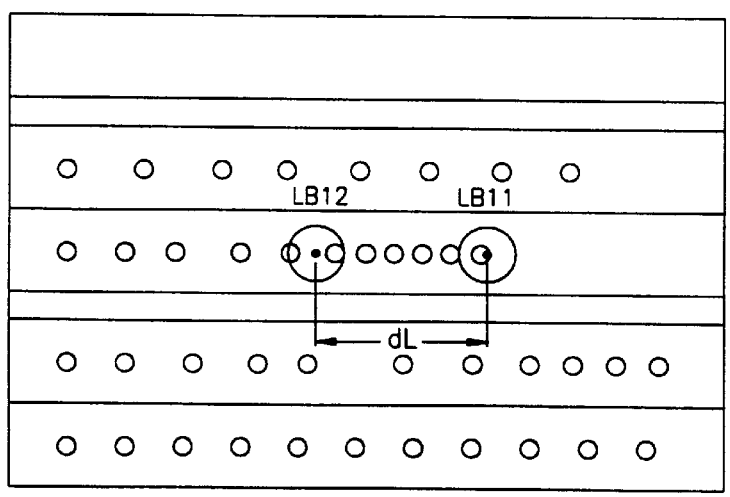
FIG. 27 is a structural view showing an array of laser beam in FIG. 25.

As shown in FIG. 27, when there are provided a pair of laser beams LBI1, LBI2, the beam spot LBI2 is placed behind the beam spot LBI1 to be spaced by a certain distance dL. Therefore, when recording on a blank disc, a signal is recorded by the beam LBI1 and read by the beam LBI2, and when recording on a recorded disc, a signal is read by the beam LBI1 and recorded by the beam LBI2, thereby requiring only a pair of laser diodes LD.

Figure 28:
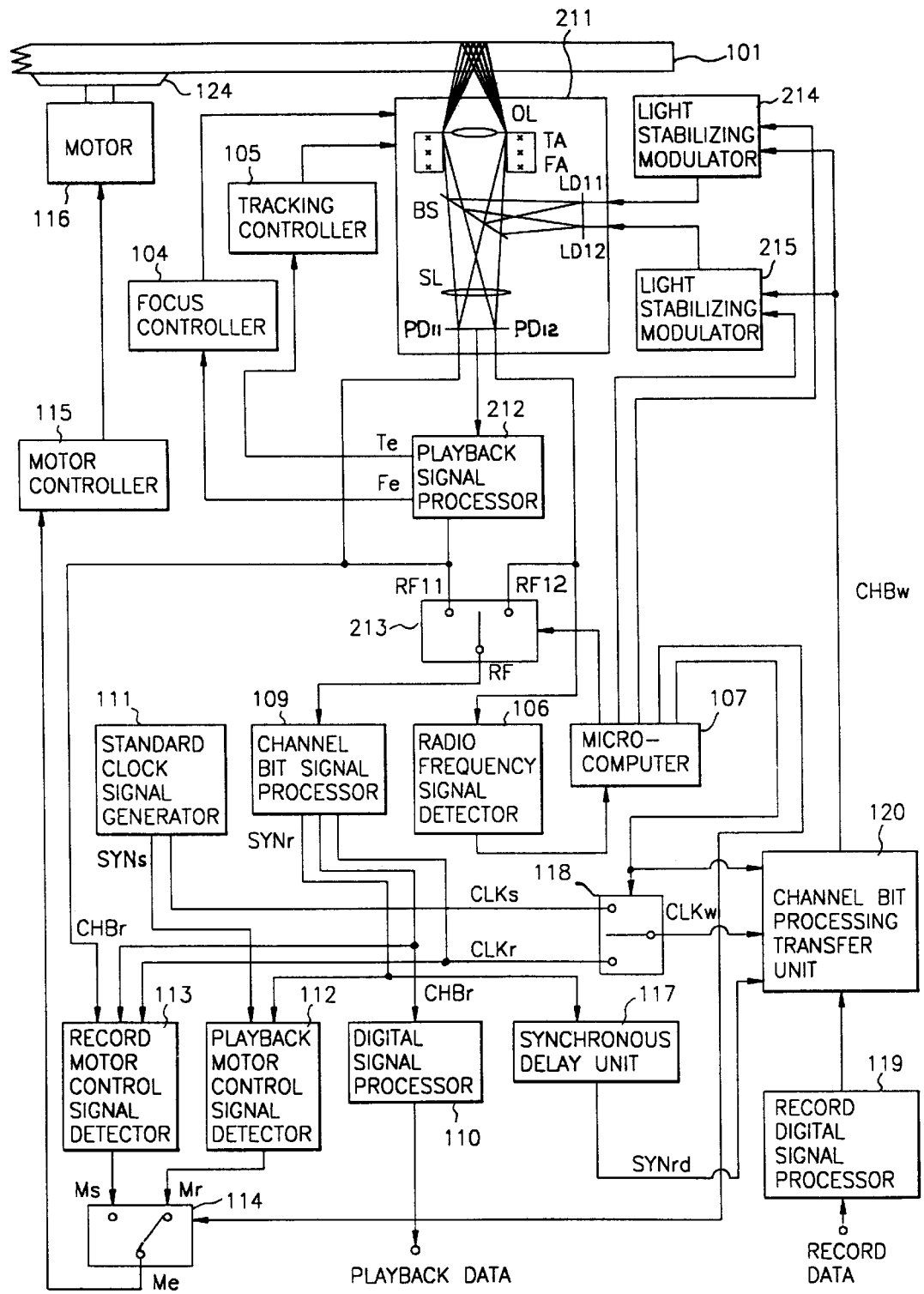
FIG. 28 is a block diagram showing a sixth embodiment of an optical disc recording/playing apparatus according to the present invention.

As shown in FIG. 28, the sixth embodiment of the optical disc recording/playing apparatus according to the present invention which employs a pair of laser diodes LD is provided by differentiating the optical pick-up 211, the playback signal processor 212 and the playback signal selector 213, eliminating the light stabilizing modulator 121, and replacing the light stabilizers 122, 123 with light stabilizing modulators 214, 215, respectively from the first embodiment of FIG. 6.

The optical pick-up 211 includes: laser diodes LD1, LD2 for generating a laser beam by the control of the light stabilizing modulators 214, 215; a beam splitter BS for reflecting the beams LBI1, LBI2 generated by the laser diodes LD1, LD2; an object lens OL for converging the laser beams LBI1, LBI2 reflected from the beam splitter BS onto a portion of a signal track of the disc; a focus activator FA and a tracking activator TA for moving the object lens OL in the direction of tracking and/or focusing so that the object lens OL can accurately converge the laser beams LBI1, LBI2 onto a signal track of the disc; a sensor lens SL for converging the beams which have passed through the beam splitter BS after being reflected from the disc; a photo detector PDI1 for converting the beam converged by the sensor lens SL to electrical signals a,b,c,d; and a photo detector PDI2 for generating a radio frequency generating signal RF13.

Figure 29:
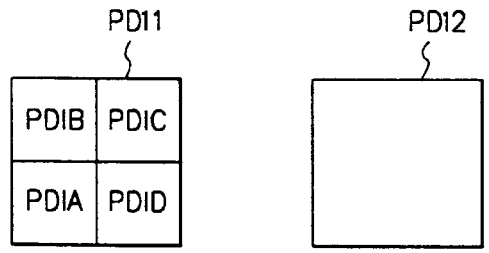
FIG. 29 is a structural view of a photo detector in FIG. 28.

As shown in FIG. 29, the photo detector PD11 is partitioned in a track-ward and radial direction to form four photo detecting elements PDA,PDB,PDC,PDD, and the photo detector PD12 is composed of a single photo element.

The playback signal processor 212 receives the electrical signals a,b,c,d output- from the photo detector PD11 and outputs a focus control signal Fe and a tracking control signal Te, and the radio frequency generating signal RF11 is applied to the record motor control signal detector 113.

The playback signal selector 213 selectively outputs the radio frequency generating signal RF11 output from the playback signal processor 212 and the radio frequency generating signal RF12, in accordance with the control of the microcomputer 107.

The operation of the thusly provided sixth embodiment of the present invention will be described.

The sixth embodiment is provided to record/play-back data using the pair of laser beams LB11, LB12, wherein a signal is read by the beam LB11 when playing back, and when recording on a blank disc, a signal is recorded by the beam LB11 and read by the beam LB12, and also when recording on a recorded disc, a signal is read by the beam LB11 and recorded by the beam LB12.

The photo detector PD11 outputs the electrical signals a,b,c,d detected in the photo detecting elements PDA,PDB, PDC,PDD to the playback signal processor 212 which in turn outputs a radio frequency generating signal RF11 by (a+b+c+d), a focus control signal Fe by (a+c)−(b+d), and a tracking control signal Te by (a+d)−(b+c).

The photo detector PD12 outputs to the playback signal selector 213 the radio frequency generating signal RF12 detected by the laser beam LB12. The focus controller 104 carries out a focus control by operating the focus activator FA in the optical pick-up 211 in accordance with the focus control signal output from the playback signal processor 212. The tracking controller 105 performs a tracking control by operating the tracking controller TA in the optical pick-up in accordance with the tracking control signal Te of the playback signal processor 212.

First, there will be explained a playing-back of a recorded signal.

The light stabilizing modulator 214 stably maintains the laser beam LB11 output from the laser diode LD11 to thereby carry out a read operation, and the laser diode LD12 is turned off in accordance with the control of the light stabilizing modulator 215.

The beam LB11 reflected against the signal surface of the disc 101 is detected in the form of the electrical signals a,b,c,d in the photo detecting elements PDA,PDB,PDC,PDD of the photo detector PD11, and the laser beam LB12 is generated in the form of a radio frequency generating signal RF13 in accordance with the photo detector PD12.

The playback signal processor 212 outputs a radio frequency generating signal RF11 by (a+b+c+d), a focus control signal Fe by (a+c)−(b+d), and a tracking control signal Te by (a+d)−(b+c) to thereby perform a focus control and a tracking control.

The playback signal selector 213 selects the radio frequency generating signal RF11 in accordance with the control of the microcomputer 107, and the selected signal RF11 is applied to the channel bit signal processor 109 and detected in the formed of a playback channel bit signal CHBr from which the playback channel bit synchronous signal SYNr and the playback clock signal CLKr are detected.

At this time, the playback channel bit synchronous signal SYNr output from the channel bit signal processor 109 and the standard synchronous signal SYNs output from the standard clock generator 111 are applied to the playback motor control signal detector 112 which in turn generates a playback motor control signal Mr. The motor control signal selector 114 receives the playback motor control signal Mr and outputs a motor control signal Me in accordance with the control of the microcomputer 107 to thereby control the spinning rate of the disc 101.

The playback channel bit signal CHBr output from the channel bit signal processor 109 is modulated and error-corrected in the digital signal processor 110 which in turn generates a playback data.

Next, a case recording data on the disc will be explained.

The laser diode LD12 is controlled by a reading photo amount in accordance with the control of the light stabilizing modulator 215, and the radio frequency generating signal RF12 detected in the photo detector 106 is applied to the radio frequency signal detector 106 to detect a playback signal and outputs the detected signal to the microcomputer 107. At this time, if there is a radio frequency generating signal it is judged that the disc is previously recorded.

Based on the judged resultant, the beam LB11 is applied to playing-back and the beam LB12 is applied to recording. Therefore, the light stabilizing modulator 215 adjusts the emitted light amount in the laser diode LD12 to a record mode in accordance with the control of the microcomputer 107, and the light stabilizing modulator 214 adjusts the emitted amount of the laser diode LD11 to a playback mode, thereby playing back the data recorded previously in the disc by the laser diode LD11 and the photo detector PD11 to result in detecting the radio frequency generating signal RF11.

The playback signal selector 213 selects the radio frequency generating signal RF11 in accordance with the control of the microcomputer 107, and the channel bit signal processor 109 detects from selected signal RF11 a playback channel bit signal CHBr, the playback channel bit synchronous signal SYNr and the playback clock signal CLKr.

The record clock selector 118 obtains a record clock signal CLKw by selecting a playback channel bit clock signal CLKr output from the channel bit signal processor 109, in accordance with the control of the microcomputer 107.

The synchronous delay unit 117 delays the playback channel bit synchronous signal SYNr output from the channel bit signal processor 109 to thereby output a delayed synchronous signal SYNrd.

The channel bit processing transfer unit 120 processes the output of the record digital signal processor 111 by an appropriate format, outputs the record channel bit signal CHBw to the light stabilizing modulator 123 in accordance with the record clock signal CLKw and controls the emitted light amount of the laser diode LD12 to thereby record a signal on the track of the disc 101.

The playback channel bit synchronous signal SYNr output from the channel bit signal processor 109 and the standard synchronous signal SYNs output from the standard clock generator 111 are applied to the playback motor control signal detector 112 which in turn generates a playback motor control signal Mr. The motor control signal selector 114 receives the playback motor control signal Mr and outputs a motor control signal Me in accordance with the control of the microcomputer 107 to thereby control the spinning rate of the disc 101.

Then, the case of a blank disc will be explained, in which case a radio frequency generating signal RF12 detected by the radio frequency signal detector 106 does not exist. when recording in a blank disc, the laser beam LB11 is used for recording and the beam LB12 is employed for playing back, so that the light stabilizing modulator 214 adjusts the emitted light amount of the laser diode LD11 to a record mode, and the light stabilizing modulator 215 adjusts the emitted light amount of the laser diode LD11 to a playback mode, in accordance with the control of the microcomputer 107.

Also, by the laser diode LD12 and the photo detector PD, the data recorded previously on the disc is played back so that the radio frequency generating signal RF12 is detected.

The playback signal selector 213 selects the radio frequency generating signal RF12 in accordance with the control of the microcomputer 107, and the channel bit signal processor 109 detects from selected signal RF12 a playback channel bit signal CHBr, the playback channel bit synchronous signal SYNr and the playback clock signal CLKr.

The record motor control signal detector 113 outputs a record motor control signal Ms by receiving the playback channel bit signal CHBr and the playback channel bit clock signal CLKr each output from the channel bit signal processor 109, a radio frequency generating signal RF11 output from the playback signal processor 212, and the record clock selector 118 receives the record motor control signal Ms and outputs the motor control signal Me in accordance with the control of the microcomputer 107 to thereby control the spinning rate of the disc 101.

The standard clock CLKs output from the standard clock generator 111 is applied to the record clock selector 118 and used as a record clock signal CLKw.

Accordingly, an information signal is recorded by the laser beam LB11, delayed for a certain time and recorded in the form of a radio frequency generating signal RF11 reproduced by the laser beam LB12, thereby enabling a constant rate in recording data.

The channel bit processing transfer unit 120 processes the output of the record digital signal processor 111 by an appropriate format, outputs the record channel bit signal CHBw to the light stabilizing modulator 214 in accordance with the record clock signal CLKw and controls the emitted light amount of the laser diode LD11 to thereby record a signal on the track of the disc 101.

Figure 30:
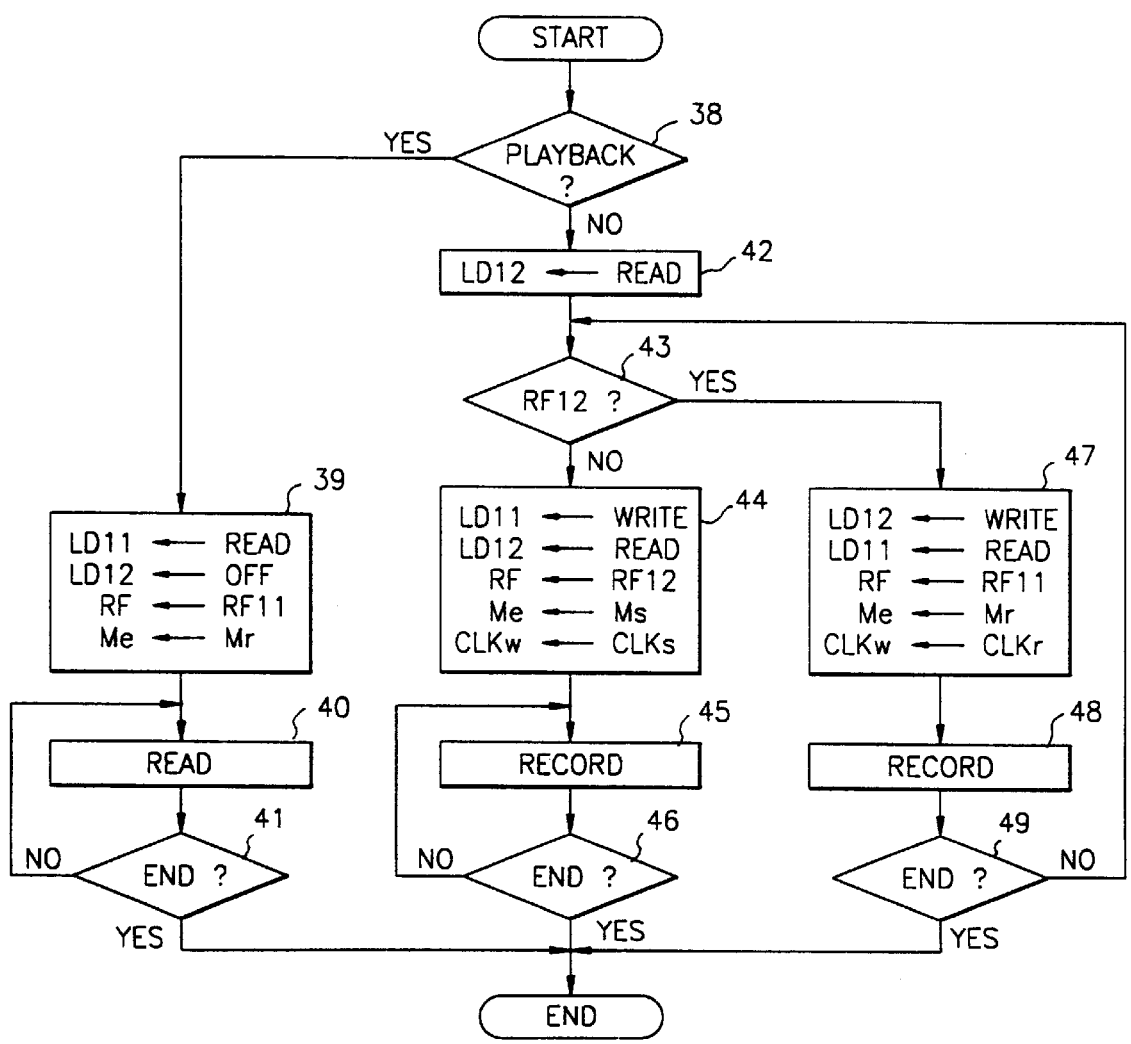
FIG. 30 is a flow chart of operation of a microcomputer for controlling the operation in FIG. 28.

With reference to FIG. 30, there will be described an operation of the microcomputer 107 to carry out the above operational steps.

First, when playing back a signal recorded in the disc 101 (38), the microcomputer 107 controls the light stabilizing modulator 214 so as to turn the laser diode LD11 to a light amount suitable to a read mode, and turns off the laser diode LD12 by controlling the light stabilizing modulator 215.

Then, by controlling the playback signal selector 108 there is selected a radio frequency generating signal RF11 output from the photo detector PD11, by controlling the motor control signal selector 114 the playback motor control signal Mr output from the playback motor control signal detector 112 is selected in the form of a motor control signal Me to thereby control motor 116. (39)

Next, the playback channel bit signal CHBr output from the channel bit signal processor 109 is modulated and error-corrected in the digital signal processor 110 and then generated in the form of a playback data to read a data recorded in the disc to thereby complete the playback operation. (40), (41)

Meanwhile, when recording a data in the optical disc 101, the laser diode LD12 is controlled to have an appropriate light amount at a read mode by controlling the light stabilizing modulator 215 and detects whether there is a detected radio frequency generating signal so as to judge whether it is a second recording on a recorded disc or an initial recording on a black disc. (42)

When there is no detected radio frequency generating signal, that is, it is judged as an initial recording, the is microcomputer 107 controls the light stabilizing modulator 214 to thereby adjust the laser diode LD11 suitable to a light amount in a read mode, and by controlling the light stabilizing modulator 215 the laser diode LD12 is controlled to have a light amount at a read mode.

Then, the radio frequency generating signal RF12 is selected from the playback signal selector 108, the record motor control signal Ms is selected from the motor control signal selector 114 in accordance with a motor control signal Me, and in accordance with the record clock signal CLKw the standard clock signal CLKs is selected. (44)

Therefore, by controlling the channel bit processing transfer unit 120 a record data is processed in an appropriate format, the record channel bit signal CHBw is applied to the light stabilizing modulator 122 in accordance with the record clock signal CLKw so as to control the emitted light amount of the laser diode LD11, thereby completing the record operation. (45), (46)

When recording a data in a previously recorded disc, the microcomputer 107 controls the light stabilizing modulator 214 to adjust the laser diode LD11 to have a light amount at a read mode, and by controlling the light stabilizing modulator 215 the laser diode LD12 is controlled to have a light amount at a read mode.

Then, the radio frequency generating signal RF11 is selected from the playback signal selector 108, the record motor control signal Mr is selected from the motor control signal selector 114 in accordance with a motor control signal Me, and in accordance with the record clock signal CLKr the standard clock signal CLKs is selected. (47)

Therefore, by controlling the channel bit processing transfer unit 120 a record data is processed in an appropriate format, the record channel bit signal CHBw is applied to the light stabilizing modulator 215 in accordance with the record clock signal CLKw so as to control the emitted light amount of the laser diode LD12, thereby completing the record operation. (48), (49)

As described above, the present invention provides an unwobbled optical disc which is not recorded by a pilot signal serving as a free-formatted auxiliary signal for detecting a disc spinning rate and an address signal for detecting the location of a signal track to carry out a record/playback operation by placing laser beam spots spaced by a certain distance on the signal track of the disc, thereby easily being applicable to a large scaled optical disc driver and enhancing compatibility of the optical disc.

What is claimed is:

1. An optical laser disc recording/playing apparatus, wherein the optical disc includes a spiral track thereon having a land and groove structure and the track is unwobbled and there is not recorded a free-formatted pilot signal for controlling a spinning rate of the disc, comprising:

an optical pick-up for recording or playing-back a data on or from a signal track of the disc by using a first, a second and a third laser beam;

a playback signal processor for generating a focusing control signal, a tracking control signal and a radio frequency signal in accordance with a signal reproduced in the optical pick-up through the first laser beam;

a radio frequency signal detector for detecting a third radio frequency signal output from the optical pick-up;

a microcomputer for receiving the output of the radio frequency signal detector and determining whether the received signal is an initial recording carried out on a blank track of the disc or a second recording carried out on a recorded track of the disc to thereby control the disc player system;

a playback signal selector for generating one selected from a first radio frequency signal output from the playback signal processor and a second and the third radio frequency signal output from the optical pick-up, in accordance with a control signal of the microcomputer;

a channel bit signal processor for processing the radio frequency signal selected from the playback signal selector and generating a playback channel bit signal, a playback channel bit synchronous signal and a playback channel bit clock signal;

a digital signal processor for decoding and error-correcting the detected channel bit signal, and generating a playback data;

a standard clock signal generator for generating a standard clock signal and a standard synchronous signal;

a playback motor control signal detector for comparing the standard synchronous signal output from the standard clock signal generator with the playback channel bit synchronous signal output from the channel bit signal processor and detecting a playback motor control signal;

a record motor control signal detector for receiving the second radio frequency signal from the optical pick-up, the playback channel bit signal and the playback channel bit clock signal from the channel bit signal processor, and detecting a record motor control signal;

a motor control signal selector for receiving one selected from the playback motor control signal output from the playback motor control signal detector and the record motor control signal output from the record motor control signal detector, and generating a motor control signal, in accordance with the control of the microcomputer;

a synchronous delay unit for delaying the playback channel bit synchronous signal output from the channel bit signal processor and generating a delay synchronous signal;

a record clock selector for receiving one selected from the standard clock signal output from the standard clock generator and the playback channel bit clock signal output from the channel bit signal processor, and generating a record clock signal, in accordance with the control of the microcomputer;

a record digital signal processor for coding and decoding a record data;

a channel bit processing transfer unit for adding the delay synchronous signal and an address signal to the output of the record digital signal processor and generating a record channel bit signal according to the record clock signal, in accordance with the control of the microcomputer;

a light stabilizing modulator for controlling the amount of the first laser beam output from the optical pick-up so as to correspond to the record channel bit signal output from the channel bit processing transfer unit, in accordance with the control of the microcomputer; and a first and a second light stabilizer for controlling the amount of a corresponding one of the second and the third laser beam output from the optical pick-up, in accordance with the control of the microcomputer.

2. The apparatus of claim 1, wherein the first laser beam is spotted on a signal track of the disc to thereby carry out a data recording and playing-back.

3. The apparatus of claim 1, wherein the second laser beam is spotted by a certain distance in rear of the first laser beam when counted by a running direction of the laser beams against the spinning direction of the disc, to thereby reproduce the data recorded by the record laser beam.

4. The apparatus of claim 1, wherein the third laser beam is spotted by a certain distance in front of the first laser beam when counted by a running direction of the laser beams against the spinning direction of the disc, to thereby reproduce the data recorded by the record laser beam.

5. An optical disc recording/playing method, wherein the optical disc includes a spiral track thereon having a land and groove structure and the track is unwobbled and there is not recorded a free-formatted pilot signal for controlling a spinning rate of the disc, comprising the steps of:

judging whether to record a data on the disc or reproduce a data recorded on the disc;

selecting, when reproducing a signal recorded on the disc according to the judged resultant, the first radio frequency signal output from a photo detector by controlling a playback signal selector and the playback motor control signal output from the playback motor control signal detector by controlling a motor control signal selector, thereby controlling a motor;

judging, when recording a signal on the disc, whether it is a first recording on a blank disc or a second recording on a recorded disc;

selecting, if it is judged to be the first recording, the second radio frequency signal output from a second photo detector by controlling the playback signal selector, the record motor control signal output from the record motor control signal detector by controlling the motor control signal selector, and the standard clock signal output from the standard clock generator by controlling the record clock selector, whereby an externally applied synchronous signal is ignored and an internal synchronous signal is generated in accordance with the control of the channel bit processing transfer unit to thereby record a data; and selecting, if it is judged to be the second recording, the third radio frequency signal output from a third photo detector by controlling the playback signal selector, controlling the motor by selecting the record motor control signal output from the record motor control signal detector in accordance with the control of the motor control signal selector, selecting the playback channel bit clock signal output from the channel bit signal processor by controlling the record clock selector, and controlling the channel bit processing transfer unit to thereby record a data.

6. An optical laser disc recording/playing apparatus, wherein the optical disc includes a spiral track thereon having a land and groove structure and the track is unwobbled and there is not recorded a free-formatted pilot signal for controlling a spinning rate of the disc, comprising:

an optical pick-up for recording or playing-back a data on or from a signal track of the disc by using a first, a second and a third laser beam which are multipled by a grating;

a playback signal processor for generating a focusing control signal, a tracking control signal and a first radio frequency signal in accordance with a signal reproduced in the optical pick-up through the first laser beam;

a first signal shaper for removing a signal which is light-modulated by shaping a radio frequency signal reproduced by the second laser beam in the optical pick-up, and generating a second radio frequency signal;

a second signal shaper for removing a signal which is light-modulated by shaping a radio frequency signal reproduced by the third laser beam in the optical pick-up, and generating a third radio frequency signal;

a radio frequency signal detector for detecting a third radio frequency signal output from the second signal shaper;

a microcomputer for receiving the output of the radio frequency signal detector and determining whether the received signal is an initial recording carried out on a blank track of the disc or a second recording carried out on a recorded track of the disc to thereby control the disc player system;

a playback signal selector for generating one selected from the second and the third radio frequency signal output from the first and the second shaper, in accordance with a control signal of the microcomputer;

a channel bit signal processor for processing the radio frequency signal selected from the playback signal selector and generating a playback channel bit signal, a playback channel bit synchronous signal and a playback channel bit clock signal;

a digital signal processor for decoding and error-correcting the detected channel bit signal, and generating a playback data;

a standard clock signal generator for generating a standard clock signal and a standard synchronous signal;

a playback motor control signal detector for comparing the standard synchronous signal output from the standard clock signal generator with the playback channel bit synchronous signal output from the channel bit signal processor and detecting a playback motor control signal;

a record motor control signal detector for receiving the second radio frequency signal from the first signal shaper, the playback channel bit signal and the playback channel bit clock signal from the channel bit signal processor, and detecting a record motor control signal;

a motor control signal selector for receiving one selected from the playback motor control signal output from the playback motor control signal detector and the record motor control signal output from the record motor control signal detector, and generating a motor control signal, in accordance with the control of the microcomputer;

a synchronous delay unit for delaying the playback channel bit synchronous signal output from the channel bit signal processor and generating a delay synchronous signal;

a record clock selector for receiving one selected from the standard clock signal output from the standard clock generator and the playback channel bit clock signal output from the channel bit signal processor, and generating a record clock signal, in accordance with the control of the microcomputer;

a record digital signal processor for coding and decoding a record data;

a channel bit processing transfer unit for adding the delay synchronous signal and an address signal to the output of the record digital signal processor and generating a record channel bit signal according to the record clock signal, in accordance with the control of the microcomputer;

a first light stabilizing modulator for controlling the amount of the first laser beam output from the optical pick-up so as to correspond to the record channel bit signal output from the channel bit processing transfer unit, in accordance with the control of the microcomputer; and a second light stabilizer for controlling the amount of the laser beam output from the optical pick-up and applying the light amount signal to the first and the second signal shaper, in accordance with the control of the microcomputer.

7. The apparatus of claim 6, wherein the optical pickup comprises:

a laser diode for generating a laser beam in accordance with the control of the light stabilizing modulator;

a grating for generating the first, the second and the third laser beam by grating a laser beam output from the laser diode;

a beam splitter for reflecting the first to third laser beams each generated from the grating;

an object lens for converging the three laser beams reflected from the beam splitter onto a portion of a signal track of the disc;

a focusing and a tracking activator for moving the object lens in the direction of tracking and/or focusing so that the object lens can accurately converge the three laser beams onto a signal track of the disc;

a sensor lens for converging a beam reflected against the optical disc and passing through the-beam splitter; and a first, a second and a third photo detectors for detecting laser beam converged by the sensor lens and generating electrical signals.

8. An optical disc recording/ reproducing apparatus performing reproduction simultaneously with recording, comprising:

recording/reproducing means for simultaneously recording new data and reproducing at least one of the recorded new data or previously recorded old data from a free-formatted optical disc which does not include a pre-recorded auxiliary signal for controlling the spinning rate of the optical disc, said recording/reproducing means including, an optical pick-up for generating a record laser beam for recording new data on the optical disc and simultaneously generating at least one playback laser beam for reproducing a signal corresponding to either the recorded new data or the recorded old data, wherein the at least one playback laser beam is spotted on a track of the optical disc at a position which is either forwardly or rearwardly of a position where the record laser beam is spotted, and a playback signal processor for receiving an output signal corresponding to the signal reproduced from the at least one playback laser beam and for generating a radio frequency signal based on the output signal; and control means for controlling a spinning rate of the optical disc based on the radio frequency signal.

9. The optical disc recording/reproducing apparatus of claim 8, wherein the control means includes spinning rate determining means for determining a spinning rate of the optical disc based on the radio frequency signal.

10. The optical disc recording/reproducing apparatus of claim 8, wherein the control means includes spinning rate control means for controlling the spinning rate of the optical disc so that the new data is recorded over the previously recorded old data.

11. The optical disc recording/reproducing apparatus of claim 8, wherein the control means includes, detecting means for detecting a timing signal from the radio frequency signal; and spinning rate determining means for determining the spinning rate of the optical disc based on the timing signal.

12. The optical disc recording/reproducing apparatus of claim 8, wherein the control means includes record position determining means for determining a position on the optical disc at which to record the new data based on the radio frequency signal.

13. The optical disc recording/reproducing apparatus of claim 8, wherein the control means includes, detecting means for detecting a timing signal from the radio frequency signal; and record position determining means for determining a position on the optical disc at which to record the new data based on the timing signal.

14. The optical disc recording/reproducing apparatus claim 13, wherein the control means includes delaying means for delaying the timing signal for a predetermined period of time data, the predetermined period of time corresponding to a period of time between the reproduction of the previously recorded old data by the recording/reproducing means at a first position and recording of new data by the recording/reproducing means at the first position.

15. The optical disc recording/reproducing apparatus of claim 8, wherein the control means includes:

spinning rate determining means for determining spinning rate of the optical disc based on the radio frequency signal; and record position determining means for determining a position on the optical disc at which to record the new data based on the radio frequency signal.

16. The optical disc recording/reproducing apparatus of claim 15, wherein the control means includes:

detecting means for detecting a timing signal from the radio frequency signal;

spinning rate determining means for determining the spinning rate of the optical disc based on the timing signal; and record position determining means for determining a position on the optical disc at which to record the new data based on the timing signal.

17. The optical disc recording/reproducing apparatus of claim 8, wherein the control means further comprises:

detecting means for detecting a timing signal from the radio frequency signal;

spinning rate determining means for determining of spinning rate of the optical disc based on the timing signal;

spinning rate control means for controlling the spinning rate of the optical disc in accordance with the spinning rate so that the new data is recorded over the previously recorded old data;

delaying means for delaying the timing signal for a predetermined period of time data, the predetermined period of time corresponding to a period of time between the reproduction of the previously recorded data by the recording/reproducing means at a first position and recording of new data by the recording/reproducing means at the first position; and record position determining means for determining a position on the optical disc at which to record the new data.

18. The optical disc recording/reproducing apparatus of claim 8, wherein a center of the least one playback laser beam and a center of the record laser beam are substantially collinear.

19. The optical disc recording/reproducing apparatus of claim 8, wherein the recording/reproducing means records new data on a blank free-formatted optical disc.

20. The optical disc recording/reproducing apparatus of claim 8, wherein the control means includes micro-processing means for determining whether the optical disc contains previously recorded data or is blank; and the control means synchronizes recording of the new data with the previously recorded old data when the micro-processing means determines that the optical disc contains previously recorded data and controls a spinning rate of the optical disc when the micro-processing means determines that the optical disc is blank.

21. The optical disc recording/reproducing apparatus of claim 20, wherein the control means includes, spinning rate determining means for determining the spinning rate of the optical disc based on the radio frequency signal, and spinning rate control means for controlling the spinning rate of the optical disc in accordance with the spinning rate so that new data is recorded over previously recorded old data when the micro-processing means determines that the optical disc contains previously recorded data.

22. The optical disc recording/reproducing apparatus of claim 19, wherein the control means includes, synchronizing timing signal generating means for generating a reference synchronizing timing signal, and record position determining means for determining a position on the optical disc at which to record the new data based on the reference synchronizing timing signal.

23. The optical disc recording/reproducing apparatus of claim 21, wherein the spinning rate determining means includes, playback spinning rate determining means for determining the spinning rate of the optical disc based on the radio frequency signal, and record spinning rate determining means for determining the spinning rate of the optical disc based the radio frequency signal; and the micro-processing means includes selection means for selecting whether the playback spinning rate determining means determines the spinning rate of the optical disc or the record spinning rate determining means determines the spinning rate of the optical disc.

24. An optical disc recording/reproducing method for performing reproduction simultaneously with recording and controlling a spinning rate of an optical disc which does not include a prerecorded auxiliary signal for controlling the spinning rate of the optical disc, the optical disc recording/reproducing method, comprising the steps of:

generating a record laser beam for recording new data on the optical disc and simultaneously generating at least one playback laser beam for reproducing a signal corresponding to either the recorded new data or previously recorded old data from the optical disc, wherein the at least one playback laser beam is spotted on a track of the optical disc at a position which is forwardly or rearwardly of a position where the record laser beam is spotted;

receiving an output signal corresponding to the signal reproduced from the at least one playback laser beam;

generating a radio frequency signal based on the output signal; and controlling a spinning rate of the optical disc based on the radio frequency signal.

25. The optical disc recording/reproducing apparatus of claim 8, wherein the control means further comprises:

detecting means for detecting a high frequency signal from the previously recorded old data; and comparing means for comparing the detected high frequency signal with a preset signal.

26. The optical disc recording/reproducing apparatus of claim 8, wherein the control means further comprises:

detecting means for detecting a high frequency signal and a low frequency signal from the previously recorded old data; and comparing means for comparing a magnitude of the high frequency signal with a magnitude of the low frequency signal.

27. The optical disc recording/reproducing apparatus of claim 8, wherein the new data is synchronized with the previously recorded old data.

28. The optical disc recording/reproducing apparatus of claim 8, wherein the new data is recorded on a blank free-formatted optical disc.

29. The optical disc recording/reproducing method of claim 24, further comprising the step of synchronizing the new data with the previously recorded old data.

30. The optical disc recording/reproducing method of claim 24, further comprising the step of recording the new data on a blank free-formatted optical disc.

* * * * *